(12) United States Patent
Bischoff et al.

(10) Patent No.: US 12,175,714 B2
(45) Date of Patent: Dec. 24, 2024

(54) VECTOR GRAPHIC PARSING AND MULTI-SEGMENT TRANSFORMATION

(71) Applicant: Pro Quick Draw LLC, St. Paul, MN (US)

(72) Inventors: Andrew Erich Bischoff, Baltimore, MD (US); Troy Bigelow, Fort Mill, SC (US)

(73) Assignee: Pro Quick Draw LLC, St. Paul, MN (US)

( * ) Notice: Subject to any disclaimer, the term of this patent is extended or adjusted under 35 U.S.C. 154(b) by 357 days.

(21) Appl. No.: 17/702,897

(22) Filed: Mar. 24, 2022

(65) Prior Publication Data

US 2023/0196628 A1  Jun. 22, 2023

Related U.S. Application Data

(60) Provisional application No. 63/291,919, filed on Dec. 20, 2021.

(51) Int. Cl.

| | |
|---|---|
| *G06T 9/20* | (2006.01) |
| *G06T 7/215* | (2017.01) |
| *G06T 7/579* | (2017.01) |
| *G06T 7/60* | (2017.01) |

(Continued)

(52) U.S. Cl.
CPC ................. *G06T 9/20* (2013.01); *G06T 7/215* (2017.01); *G06T 7/579* (2017.01); *G06T 7/60* (2013.01); *G06T 7/73* (2017.01); *G06T 15/205* (2013.01)

(58) Field of Classification Search
CPC ............................... G06T 9/20; G06T 15/205
See application file for complete search history.

(56) References Cited

U.S. PATENT DOCUMENTS

| | | | | |
|---|---|---|---|---|
| 5,838,365 | A | * | 11/1998 | Sawasaki ............... G06F 17/153 348/169 |
| 6,202,061 | B1 | | 3/2001 | Khosla |
| 7,139,095 | B1 | | 11/2006 | Hunter |

(Continued)

OTHER PUBLICATIONS

Oct. 28, 2020 USPTO Office Action (U.S. Appl. No. 16/793,594)—Our Matter 6141.

(Continued)

*Primary Examiner* — Edward Park
(74) *Attorney, Agent, or Firm* — Forsgren Fisher; Daniel A. Tysver; James M. Urzedowski

(57) ABSTRACT

A system and method are presented that scans a vector graphics file for image elements that appear over a background image. The image elements represent individual objects and movement or actions for those objects. The image elements, each possibly represented by multiple shapes, arrows, lines, or shading, are identified and parsed into a standard class definition. In one embodiment, the class definitions and the rule set applied to perform this parsing are pre-defined according to the content of the SVG file. The image elements are then redrawn over a new background image, which has multiple segments that correspond to the original background image but where each segment has a different segment transformation that defines translation and/or scaling required to move between the image segments. The image elements are then scaled and translated according to the multiple segment transformations, and then are presented over the new background image.

18 Claims, 25 Drawing Sheets

(51) Int. Cl.
*G06T 7/73* (2017.01)
*G06T 15/20* (2011.01)

(56) References Cited

U.S. PATENT DOCUMENTS

| | | | |
|---|---|---|---|
| 2004/0057064 A1 | 3/2004 | Stringham | |
| 2008/0288590 A1 | 11/2008 | Lynch | |
| 2012/0110439 A1 | 5/2012 | Rosner | |
| 2012/0154608 A1 | 6/2012 | Ko | |
| 2013/0316837 A1 | 11/2013 | Coiner, Jr. | |
| 2013/0346874 A1 | 12/2013 | Wallace | |
| 2016/0193530 A1 | 7/2016 | Parker | |
| 2017/0336195 A1* | 11/2017 | Suzuki | G01B 11/00 |
| 2018/0005544 A1 | 1/2018 | Molenje | |
| 2018/0129634 A1 | 5/2018 | Sivaji | |
| 2019/0163970 A1 | 5/2019 | Yu | |
| 2020/0387854 A1* | 12/2020 | Mustafi | G06V 20/63 |
| 2021/0354017 A1 | 11/2021 | Friehauf | |

OTHER PUBLICATIONS

Jun. 10, 2021 USPTO Office Action (U.S. Appl. No. 16/793,594)—Our Matter 6141.
"3D Graphics Overview", WPF .NET Framework, Dec. 4, 2020, p. 1-17.
"3D Transformations Overview", WPF .NET Framework, Dec. 4, 2020, p. 1-14.
"Animation Overview", WPF .NET Framework, Aug. 12, 2021, p. 1-23.
"Maximize WPF 3D Performance", WPF .NET Framework, Sep. 4, 2020, p. 1-7.
"Path Animations Overview", WPF .NET Framework, Sep. 4, 2020, p. 1-9.
"Timing Events Overview", WPF .NET Framework, Sep. 4, 2020, p. 1-6.

* cited by examiner

Figure 23

```
<g id="diagram" transform="translate(0,34) scale(1.0)">
  <rect x="0" y="0" width="960" height="686" fill="#FFFFFF" fill-opacity="1.0" stroke="none" stroke-
      opacity="1.0"></rect>
  <rect x="-0.0" y="8.153691423895687" width="12.000750046877931" height="2" fill="#EBEBEB" fill
      opacity="1.0" stroke="none" stroke-opacity="1.0"></rect>
  <rect x="412.52578286142887" y="8.153691423895687" width="12.000750046877931" height="2"
      fill="#EBEBEB" fill-opacity="1.0" stroke="none" stroke-opacity="1.0"></rect>
...
</g>
<text x="35" y="24" text-anchor="start" fill="#000000" fill-opacity="0.9" style="font: 28px Arial;"
transform="rotate(0)">
  <tspan x="35" dy="0">
    P#3 CHI O @ PIT D 4248744 21-09 11/9, 0-0 1Q 13:49 3/5 -27
  </tspan>
</text></svg>
```

Figure 24

```
<Canvas Name="diagram">
  <Rectangle Fill="White" Width="960" Height="686"/>
  <Rectangle Fill="#FFEBEBEB" Width="12.0007500468779" Height="2" Canvas.Top="8.15369142389569"/>
  <Rectangle Fill="#FFEBEBEB" Width="12.0007500468779" Height="2" Canvas.Left="412.525782861429"
      Canvas.Top="8.15369142389569"/>
...
</Canvas>
<TextBlock Text="P#3 CHI O @ PIT D 4248744 21-09 11/9, 0-0 1Q 13:49 3/5 -27" FontFamily="Arial"
      FontSize="12" Foreground="#E6000000" Canvas.Left="35" Canvas.Top="12.94"/>
```

VECTOR GRAPHIC PARSING AND MULTI-SEGMENT TRANSFORMATION

RELATED APPLICATION

This application claims benefit to U.S. Provisional Application No. 63/291,919, filed on Dec. 20, 2021. The present application is also related to U.S. patent Ser. No. 17/463,439, filed on Aug. 31, 2021, which claimed the benefit of U.S. Provisional Patent Application No. 63/073,128, filed on Sep. 1, 2020. All of these priority and related applications are hereby incorporated by reference in their entireties.

FIELD OF THE INVENTION

The present application relates to the field of computer graphics. More particularly, the present application relates to a parsing and transformation engine that analyzes 2D graphical image objects for positional analysis relative to an initial background, separately identifies movement and image objects, and performs a multi-segment transformation of the objects for positioning and scaling over a new background image.

SUMMARY OF THE INVENTION

One embodiment of the present invention scans a graphics files, such as an SVG (Scalable Vector Graphics). Renderable objects, each graphically represented in the SVG file by one or more shapes, lines, text, and/or shading, are identified by the parsing engine and saved into an object according to a predefined class definition. In one embodiment, the class definitions and the rule set applied to perform this parsing are altered as necessary to conform to the content of the SVG file. Movement for the identified renderable objects, which are also graphically represented in the SVG file, are identified, associated with a particular renderable object, and saved through the same class definition. The instantiated object, sometimes referred to as the card object or the card object structure, is then used to feed renderable objects and movement to a different program, such as by submitting this information in the appropriate format to the API of the 3D graphic engine.

In one example embodiment, the present invention is used to parse and transform vector graphics that represent "plays" in the context of a sport or game. The play may be an American football play, a basketball play, a chess move, a set piece play in soccer, a lacrosse play etc. The vector graphics may also be unrelated to a sport or a game, such as diagram of an automobile accident or any other drawing that may include objects and indications of movement. In the context of a football play, the SVG file may include symbols, texts, and lines that identify the offensive and defensive players and their associated motions, routes, blocking assignments, etc. Once players are identified, close lines are associated with the players, and each line is walked until the end of line is found. Line ends (arrow, circle, block lines) are then associated with each line based on proximity to the end of each line.

Once the play has been successfully parsed, the play data is transferred into an object in a database, where all geometry data needed to reproduce the play is stored. This object can then be transformed into any type of file, for example a Byte Cubed JSON file for rendering in a 3D Gaming Engine, Microsoft WPF 3D, or into two-dimensional graphics files such as the PowerPoint or Visio formats used by the like-named software products provided by Microsoft (Redmond, WA).

The same parsing engine can be used to parse other types of SVG files. When used in other contexts, different object classes are developed. Rules are utilized to identify and group shapes based on position and size, and convert the shape groupings into element of the defined object class. For example, business diagrams are different than football plays, which are different than diagrams of rooms in a house, which in turn differ from automobile accident diagrams. Each context will require different parsing rules to identify the object based on the known conventions for identifying elements and known "legal" arrangement of icons in each type of input file.

In one embodiment, the textual representation of a graphics file is analyzed in order to populate the card object. Rules for this analysis can be pre-defined or hard coded in order to properly parse the graphics file.

In another embodiment, the position of objects and movement representation is identified relative to a first background image. Objects and movements are stored in the database objects, but then transformed for presentation into a second background image. The first and second background images are similar but have different dimensional segments. Each segment relates to a different portion of the background image, and the required transformation from one background image to the other differs based on the segments in which objects and transformations are found.

BRIEF DESCRIPTION OF THE DRAWINGS

FIG. 23 is a portion of a native textual representation of the first format graphics file of FIG. 21.

FIG. 24 is a portion a simplified file version the native textual representation of FIG. 23.

DETAILED DESCRIPTION

System

Figure 1:
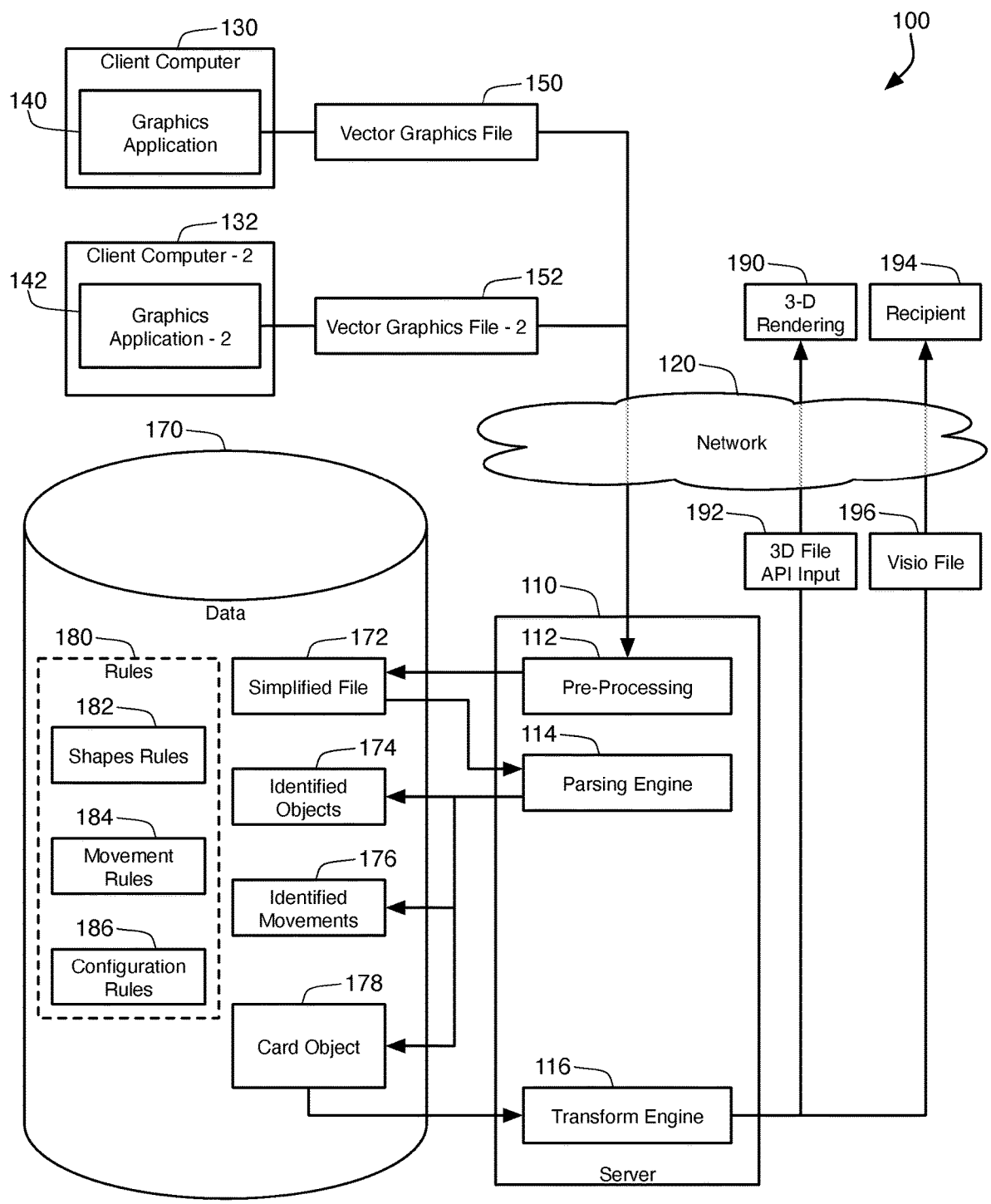
FIG. 1 is a schematic view of a system for parsing a vector graphics file.

FIG. 1 a system 100 that can be utilized to implement the present invention. The system 100 utilizes a server 110, which may take the form of one or more computer systems acting together to provide services to other devices over a network 120. In this case, the server 110 receives data from a client computer 130. The client computer operates a graphics application 140 to create a file 150 that is transmitted over the network 120 to the server 110. This file 150 is a graphics file, and more particularly is a two-dimensional (2D) vector graphics file. The server 110 may receive files from multiple client computers, with client computer-2 132 operating a different graphics application 142 to create vector graphics file-2 152.

In one embodiment, the graphics file 150 received from the client computer 130 is an SVG file. SVG stands for "Scalable Vector Graphics," and is an Extensible Markup Language (XML)-based vector image format for two-dimensional graphics. Some programs, such as Microsoft's Visio and PowerPoint applications, can save their work product directly as an SVG file. This is usually accomplished by exporting the document from a native format to an SVG file. Other programs can also create SVG files, such as Pro Football Focus (or "PFF," from Play Football Focus, Cincinnati, OH), which creates football play diagrams. The two graphics applications 140, 142 shown in FIG. 1 generally create files with incompatible formats, but both create SVG files for receipt by the server 110. For the purposes of describing the present invention, the input graphics file 150 will be considered the file received by the server 110. Furthermore, this file 150 will be considered an SVG file, although the invention will work equally effectively with other file formats.

Once the incoming file 150 for processing is received, the file is pre-processed using the pre-processing engine 112. This engine 112 will convert the received file 150 into a simplified file format 172 that is stored in data storage 170 that associated with the server 110. In one embodiment, the pre-processing engine 112 utilizes Ab2d.ReaderSvg software provided by AB4D (Ljubljana, Slovenia). The Ab2d.ReaderSvg software converts the input SVG file into a WPF ("Windows Presentation Foundation") file format file. WPF is a free and open-source graphical subsystem developed by Microsoft for user interfaces in the Windows operating system. The SVG file format is a very flexible and complex file format, but programs that export to SVG can create very different SVG output for the same drawing. To remove this complexity and variability, the Ab2d.ReaderSvg software is used to convert disparate SVG files and convert them to the simpler WPF format. The WPF format can utilize XAML (Extensible Application Markup Language), which is a declarative XML-based language developed by Microsoft that is used for initializing structured values and objects The parsing engine 114 takes this simplified file 172, parses the file for renderable objects 174 and associated movements 176, temporarily stores this data 174, 176 in the server's data 170, populates a card class object 178 and stores this in data 170. The parsing engine 114 utilizes rules 180 that can also be stored in the data 170 to perform its parsing. This rules 180 include information about known shapes 182 and movement/line rules 184 that can be identified in the simplified file 172 in order to populate the card object 178. The rules 180 also contain configuration rules 186 that define the possible overall configuration of the input file 150 in order to aid in the identification and extraction of data from that file. These configuration rules 186 may define the configurations that are allowed to exist based on the type of the input file.

The populated object 178 is then transformed into another format using the transform engine 116. The transform engine can interact with a motion-providing 3D rendering engine 190 using API input 192, such as the engine 190 and API 192 provided by ByteCubed. Alternatively, the transform engine 116 can create another 2D file such as a Visio file 196 (from Microsoft) that is transmitted to a recipient device 194. Note that the recipient device 194 may be the same computing system that operated as the client computer 130 that transmitted the vector graphics file 150. The techniques used by the parsing engine 114 and transform engine 116 are described below.

The server 110, the client computers 130, 132, the 3-D rendering engine 190, and the recipient device 194 shown in FIG. 1 are all computing devices. That means that each device 110, 130, 132, 190, 194 includes a processor for processing computer programming instructions. In most cases, the processor is a CPU, such as the CPU devices created by Intel Corporation (Santa Clara, CA), Advanced Micro Devices, Inc (Santa Clara, CA), or a RISC processer produced according to the designs of Arm Holdings PLC (Cambridge, England). Furthermore, these computing devices 110, 130, 132, 190, 194 have memory, which generally takes the form of both temporary, random access memory (RAM) and more permanent storage such a magnetic disk storage, FLASH memory, or another non-transitory (also referred to as permanent) storage medium. The memory and storage (referred to collectively as "memory") contain both programming instructions and data. In practice, both programming and data will be stored permanently on non-transitory storage devices and transferred into RAM when needed for processing or analysis.

Figure 2:
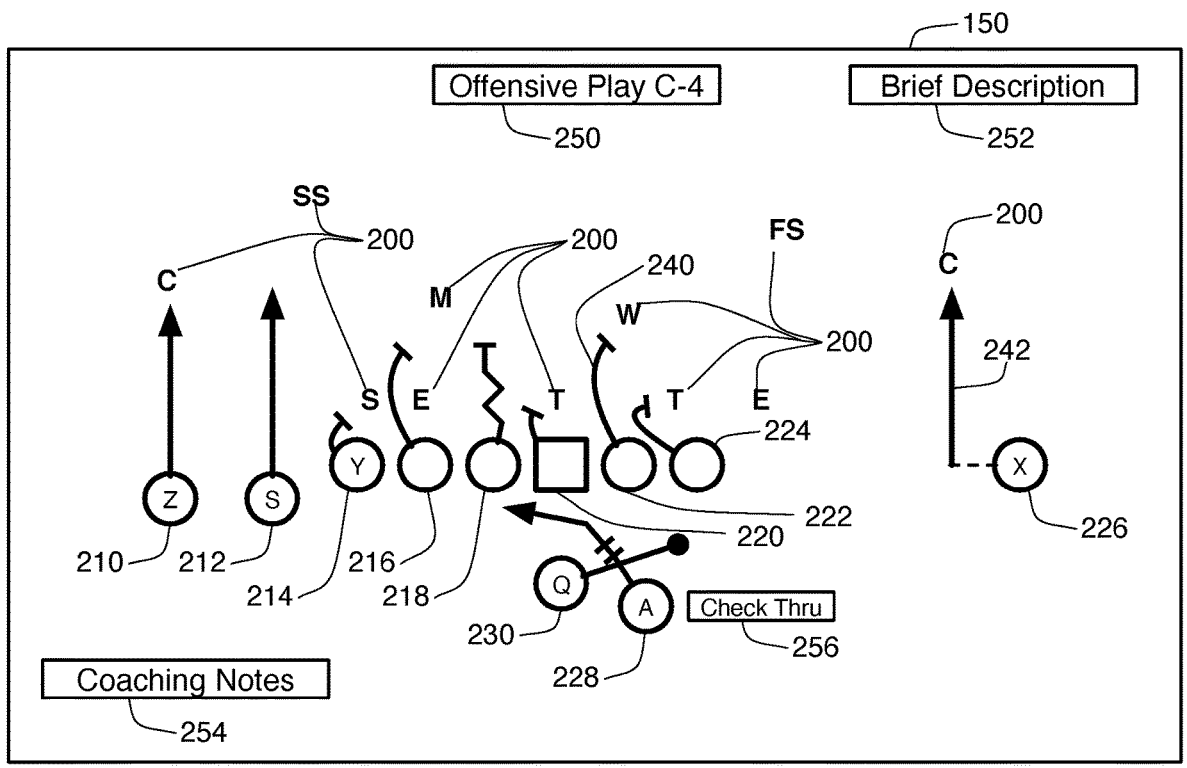
FIG. 2 is a schematic view of an input file.

The data 172, 174, 176, 178, 180 shown in FIG. 2 can be separated into physical files, such as files 172; pure data, such as the objects 174, movements 176, and the populated data object 178; and data rules 180. The files 172 can be stored in data 170 in a file system, as is known in the prior art. The pure data 174, 176, 178 is stored in some type of structured data store, which may take the form of a standard database. The rules 180 (including known shapes 182 and movement rules 184), can also be stored in a data store, but may include both raw data and programming designed to associated identified shapes and line variations with objects 174 and movement 176.

This data 170 may physically be located within or as part of the server 110 or may be located remotely from the server 110 over a local area network, a storage area network, or even a remote wide area network. If located remotely, the data 170 may be controlled by a separate data controller computer (not shown). The data 170 may store data in one or more defined database entities. These entities may constitute database tables in a relational database, or database objects in an object-oriented database, or any other type of database entity usable with a computerized database. In the present embodiment, the phrase database entity refers to data records in a database whether comprising a row in a database table, an instantiation of a database object, or any other populated database entity. Data 170 can be "associated" with other data. This association can be implemented using a variety of techniques depending on the technology used to store and manage a database, such as through formal relationships in a relational database or through established relationships between objects in an object-oriented database.

The engines 112, 114, 116 constitute computer programming operating on the CPU device(s) of the server 110. These different engines 112, 114, 116 can be executed as separate programs, or as separate routines, or they can be implemented as separate functions of a single, integrated computer program.

Overall Method and Play Diagram

FIG. 2 shows the content of an input graphics file 150 as received by the server 110. The pre-processing engine 112 receives this file 150 and simplifies the instructions within the file 150 that define the various objects, lines, and data elements shown in FIG. 2 in order to create the simplified file 172. While the instructions that define the objects, lines, and data elements are simplified, a visual representation of the simplified file 172 should appear identical to the input file 150. Thus, while FIG. 2 shows the input file 150, the same representation would be accurate for the simplified file 172. The following description of the parsing engine 114 will therefore discuss parsing the visual content of the input file 150 even though, in at least one embodiment, the parsing engine 114 operates on the simplified file 172 and not directly on the input file 150.

The content of the input file 150 is shown in FIG. 2. This content represents an American football play diagram. The file 150 shows eleven defensive players 200 represented by single character strings in the diagram. The file 150 also shows eleven offensive players 210-230, which are represented by closed shapes, namely ten closed circles 210-218, 222-230 and one closed square 222. These closed shapes 210-230 sometimes include text characters within their boundaries, such as the "Z" within circle 210 and the "Q" in circle 230.

In this input file 150, each of the offensive players 210-230 are associated with a movement line, such as line 240 associated with offensive player 222 and line 242 associated with offensive player 226. These lines 240, 242 have a base that is connected to (or otherwise located proximal to) the closed shape representing the players 222, 226, and they have various shapes, directions, and termination elements. The termination elements can be an arrowhead, in the case of line 242, or a blocking line used in football play diagram, in the case of line 240. Other types of termination elements are possible.

The input file 150 also includes textual elements, such as a title 250, a description 252, coaching notes 254, and a textual element description 256. Some of these textual elements, namely elements 250-254, are located at preset locations in the input file 150, such as at the top middle location, the top right location, and the lower left location, respectively, of the file 150. Other textual elements are associated with one of the offensive players. In some embodiments, it may be possible to identify a text object, such as the "Check Thru" object 256 as being located proximal to particular offensive player 228 and therefore be associated with that player object 228. In other embodiments, the text object 256 would be rendered as part of the background or setting for the other objects. In still further embodiments, this text object 256 would not be rendered as part of the setting but would instead be saved as text data associated with the entire file 150.

This input file 150 shows a football play. Even if all input files 150 received by the server 110 represent football plays, the variations possible within this this type of file are numerous. The offensive players 210-230, for example, can be in a different formation, can run different patterns and have different blocking assignments, can include different player types, can be oriented differently, can utilize different shapes, can be shaded or color-coded, etc. Furthermore, the server 110 is not limited to operating only on these types of files 150, as other types are possible, such as those described below in connection with FIGS. 9 and 10.

The closed shapes 210-230, the characters 200, as well as the lines 240, 242, and the textual elements 250-254 can all be considered graphic elements that are found in the input file 150. The parsing engine 114 applies rules or hardcoded programming to parse the graphic elements found in this file 150 (or, as explained above, the simplified file 172). The goal of this parsing process is to populate a data structure 178 that defines elements or objects for the various items that are shown in the image file 150 being processed. This data structure 178 is described in more detail in connection with FIGS. 17 and 18 below. In the context of a football play, such as that shown in FIG. 2, the goal is to populate the PlayCard class structure 1700 shown in FIG. 17, which is a simplified representation of the class definition for defining the elements of a football play.

The parsing engine 114 is programmed with an understanding of legal offense formations, which allows the engine 114 to group shapes identified by similar Y position and similar size to identify offense players consistently. In some embodiments, the consistent use of symbols in the input file 150 can be identified and used as part of the parsing process. For example, the center position may be drawn as a rectangle or square, with offensive players drawn as ellipses or circles. Defense players may be indicated using text blocks with 3 or fewer characters.

Figure 3:
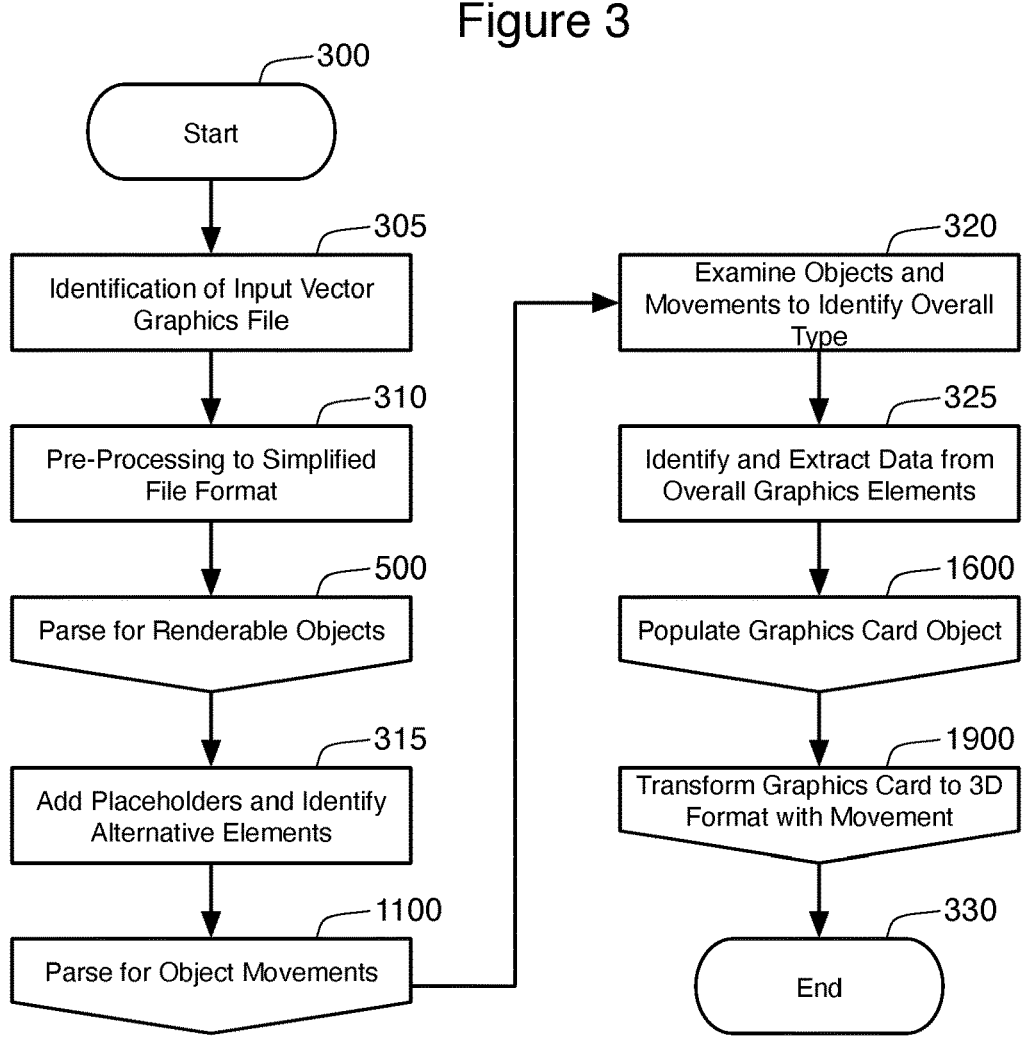
FIG. 3 is a flow chart showing a method for a parsing and rendering a vector graphics file.

The overall process 300 performed by the server 110 on the incoming file 150 is shown in the flow chart of FIG. 3. The first step 305 is the identification of the input vector graphics file 150. This identification step 305 can be as simple as receiving the file 150 from the client computer 130 over the network 120 with a request to process the file 150. In some embodiments, it is possible to operate the engines 112, 114, 116 of the server 110 locally at the client computer 130. In these embodiments, the processing of the engines 112, 114, 116 would function similarly, and the identification step 305 might constitute opening the file 150 in an application that contains the programming for these engines 112, 114, 116.

The next step 310 is to use the pre-processing engine 112 to convert the incoming vector graphics file 150 into a simplified file 172. In one embodiment, the input file 150 is in SVG format, the pre-processing engine 112 is the Ab2d.ReaderSvg software described above, and the simplified file 172 is in the WPF file format. Other pre-processing software could be used. Alternatively, the input file 150 provided by the client computer 130 could be created in a simplified file format (such as WPF), meaning that the pre-processing step 310 would not be required. In other embodiments, the parsing engine 114 would operate directly on the non-simplified file 150. In this way, step 310 can be skipped depending on the structure of the received file 150 and the programming of the parsing engine 114.

Figure 4:
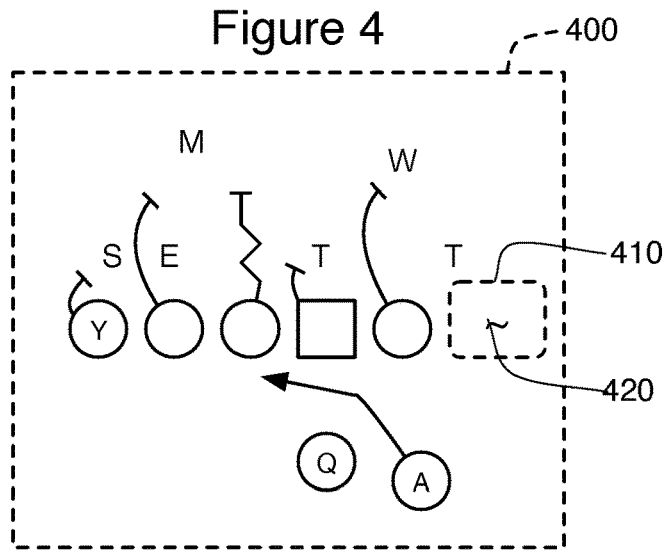
FIG. 4 is a first portion of a second embodiment of an input file.
Figure 5:
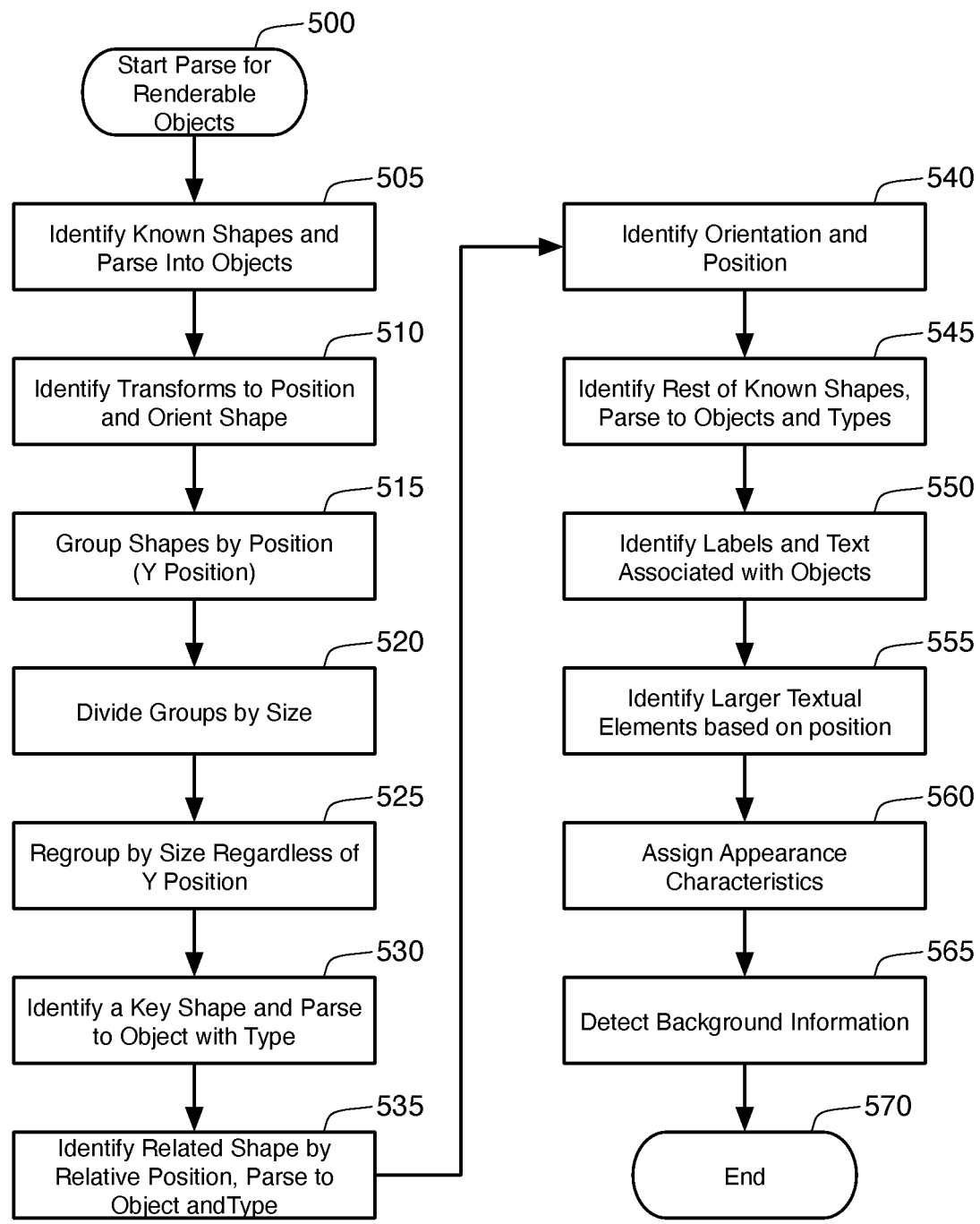
FIG. 5 is a flow chart showing a method for parsing renderable objects.

After this, the parsing engine 114 will parse the simplified file 172 to identify objects 174 found in the file 150 according to the rules 180. This occurs in subprocess 500, which is described in connection with the flowchart of FIG. 5 in more detail below. This subprocess 500 will utilize the rules 180 to not only identify separate objects 174, but to uniquely identify different types of objects 174 and the expected overall location of the objects 174 with respect to one another in the input file 150. In some cases, however, the subprocess 500 will identify a location where an object 174 is expected to be found, but the rules 180 do not accurately allow the specific identification of any object 174 at that location. If the server 110 during subprocess 500 fails to identify an object at this known location, the server 110 will instead, at step 315, will create a placeholder object at that location. FIG. 4 shows a subsection 400 of a play diagram in which the position of an expected but not found object 174 is identified by step 315, and a placeholder 410 has been positioned. This placeholder 410 is represented by the dashed box 410 shown in FIG. 4, which in this case was drawn around an extraneous symbol or graphical item 420. The extraneous item 420 in this case is a tilde ("~") character. The placeholder box 410 identifies the location where the missing item should be found. Although the placeholder box 410 is shown as a graphics box drawn within the subsection 400, there is no need for the parsing engine 114 to actual draw such a box—it is only necessary for the parsing engine 114 to identify and (temporarily) remember the location of this box. After step 315 identifies this location 410, it then examines the content of the input file 150 (or the simplified file 172) at that location to see if another symbol or unexpected graphics shape is found at that location. If one is found, such as the tilde character 420, then that object 420 is identified as the missing object even though the rules 180 failed to provide instructions that this character (the tilde 420) was to be considered an object 174.

Next, the parsing engine 114 will parse the input file 150 (again, this may be accomplished by parsing the simplified file 172) to identify object movements 176 through process 1100. This process 1100 is described in detail below in connection with FIG. 11.

After the objects 174 and object movements 176 have been identified by the parsing engine 114, the server 110 will examine these objects 174 and movements 176 to identify an overall type for the input file 150. In the context of a football play, the positions of the identified objects 174 can determine a formation for the play, and the movements 176 of these objects 174 can determine a play type. In at least one embodiment, the configuration rules 186 provide details to be able to identify a formation and play type based on this information at step 320.

At step 325, the server will identify text elements that are not associated with objects. As explained below, letters within shapes are associated with individual objects, but other text elements, such as elements 250, 252, 254, are identified at step 325 and are associated with the overall file 150.

Figure 16:
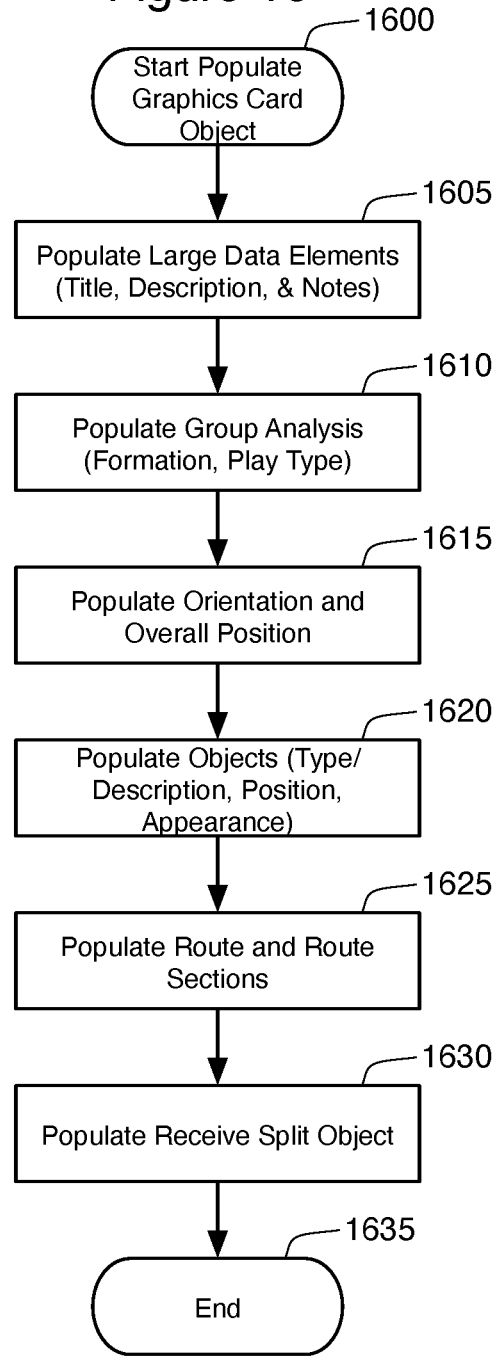
FIG. 16 is a flow chart showing a method for populating a card data entity.

At step 1600, the card object 178 is populated, which is again shown in detail in a separate flow chart as seen in FIG. 16. Then, at step 1900, the data in object 178 is used by the transform engine 116 to provide input 192 to a 3-D rendering engine 190, as set forth in FIG. 19. The engine 190 then renders the input 192 and generates the movement of the defined objects. The process 300 then ends at step 330.

Object Parsing Method 500

The parsing engine 112 is responsible for taking the simplified file 172 (or the input file 150, depending on the embodiment) and identifying objects 174 and the movement 176 of objects 174, and populating the card object 178. These separate functions are described in the object parsing method 500 of FIG. 5, the movement parsing method 1100 of FIG. 11, and the card object population method 1600 of FIG. 16.

Figure 6:
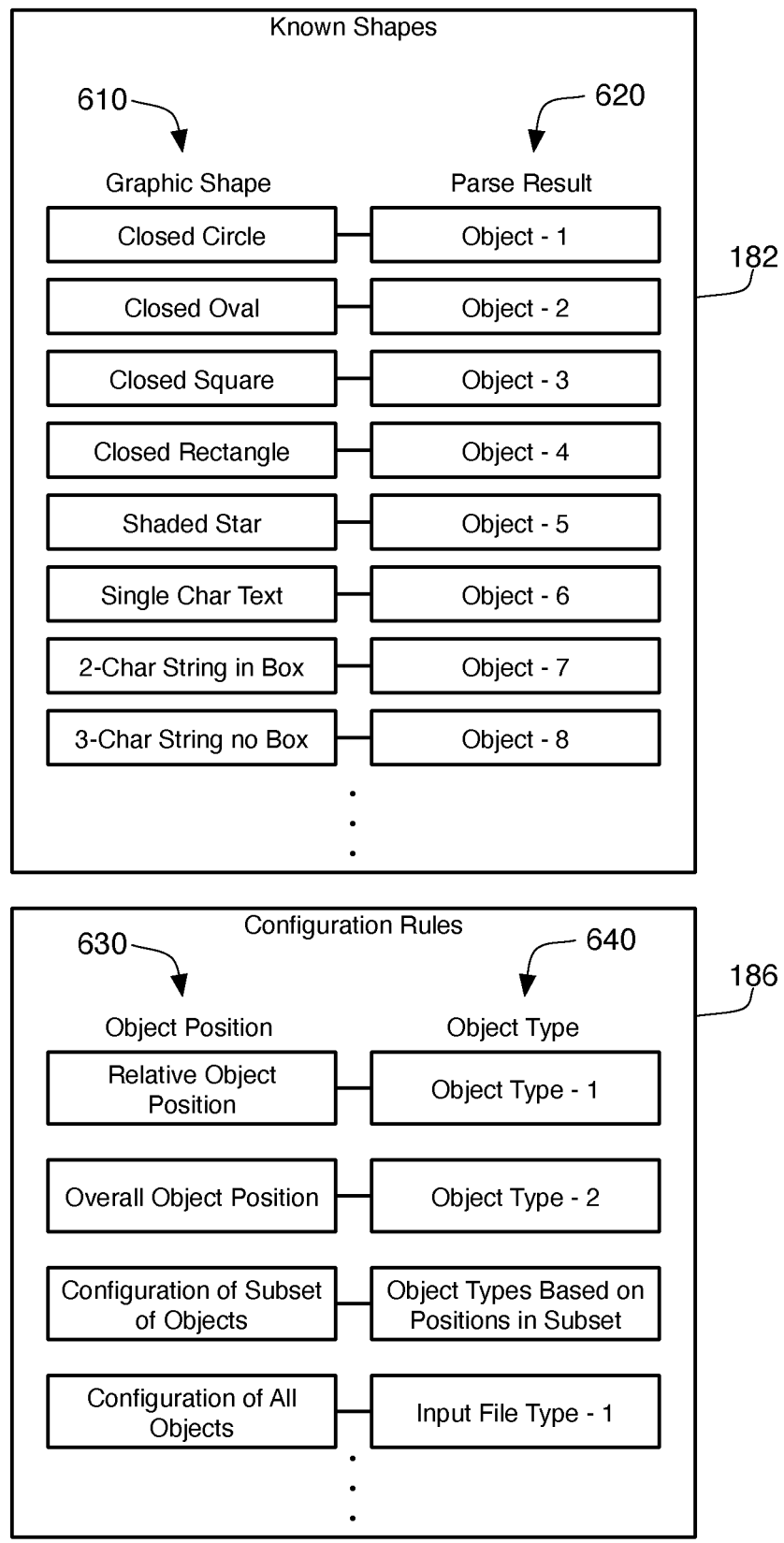
FIG. 6 is a schematic view configuration rules for object parsing.

The object parsing method 500 starts at step 505 with the system 100 using the known shapes rule 182 information found in the rules 180 to identifying separate elements in the input file 150 that match known shapes. The known shapes rules 182 associate a particular graphic shape 610 with a particular object or element 620, as is schematically shown in FIG. 6. In effect, applying the rules 182 classifies the shapes 610 into a particular category or object type 620. The closed circle shape is parsed into the object-1 result, the closed oval shape is parsed into the object-2 result, the closed square shape into object-3, and so on. In the context of a football play, the graphic shapes 610 are generally geometric shapes (circles, ovals, squares, rectangles) or one-to-three-character (chars) text strings. The object types associated with these shapes might be "offensive player" and "defensive player," or may be more specific (such as "quarterback," "center," or "tackle"). These graphic shapes will differ in other embodiments when the parsing engine is used in other contexts.

Figure 15:
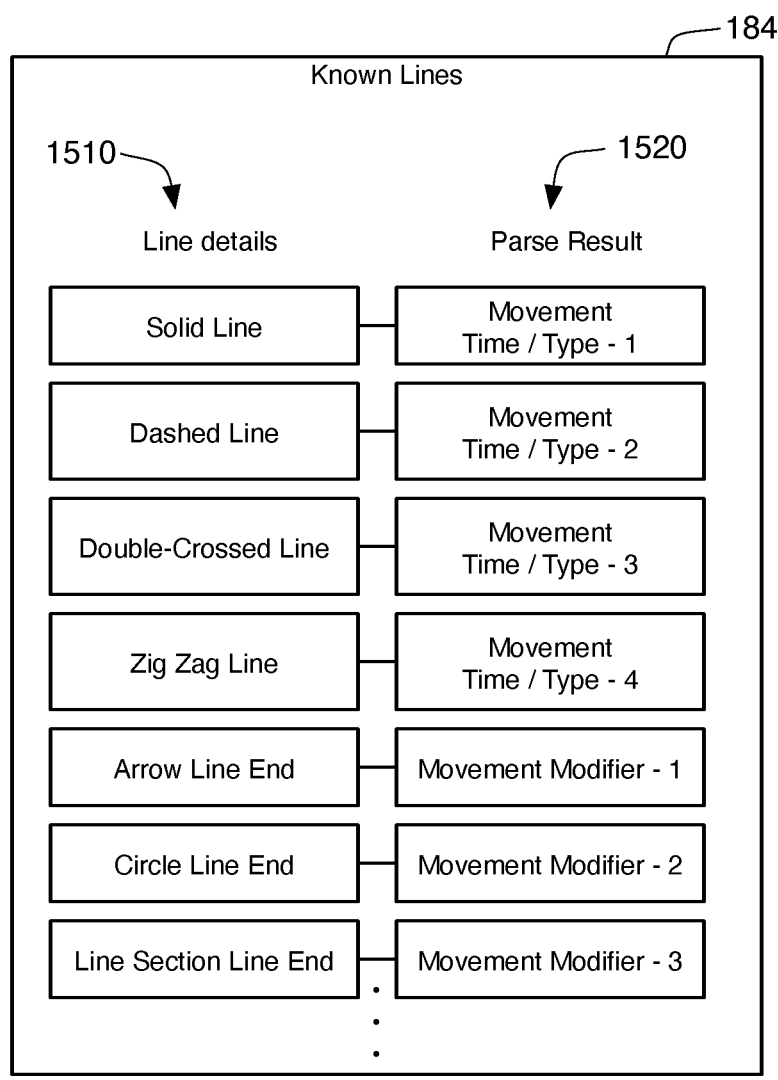
FIG. 15 is a schematic view of rules for movement parsing.

FIG. 6 also shows some details associated with configuration rules 186 (movement/line rules 184 are shown in FIG. 15). Configuration rules 186 describe knowledge that can be learned based on the position of an identified object 174 in the input file 150, or the position of one object 174 with respect to another known object 174. Configuration rules 186 can be used, for example, to identify a type characteristic for an identified object 174 based on its fixed position in the overall file 150 or its relative position relative to another object 174. Configuration rules 186 can also analyze all or a subset of the identified objects 174 to determine some characteristic of the entire input file 150. Thus, configuration rules 186 have inputs 630 related to the position of one or more objects 174 and outputs 640 that help characterize an object 174, a group of objects 174, or even the entire input file 150.

When the input file 150 is in the WPF file format, or where a simplified file 172 using the WPF file format is being parsed, the graphic shapes 610 will be defined as known shapes within the file 150 itself. In particular, WPF uses a "shape" object that include the following shapes: ellipse, rectangle, line, path, polygon, and polyline. The shapes can be defined with stroke, strokeThickness, and fill properties. Circles are ellipses with equal height and width values, and squares are rectangles with equal height and width.

At step 510, the server 110 determines the transformations (scale, rotate, translate) appropriate to ensure the position and size are correct for each object in the drawing. In other words, this step identifies the locations of each of the objects in the drawing (through the determination of translations), the orientation of each of the objects (through the determination of rotations, if any), and the size differences between the objects (through the determination of scale transformations, if any). Transforms are used by a variety of graphics drawing tools (SVG and WPF included) to place and size a shape on a page (or some other defined space). By utilizing transforms, an object that is copied, flipped, rotated, resized, and moved when created may be stored in the resulting graphics file as the originally copied object along with transformations that flip, rotate, resize, and move the object. Note that these transformations may not have been found in the input file being parsed 150, which may have specified positions through absolute coordinates and sizes as opposed to transformations.

Figure 7:
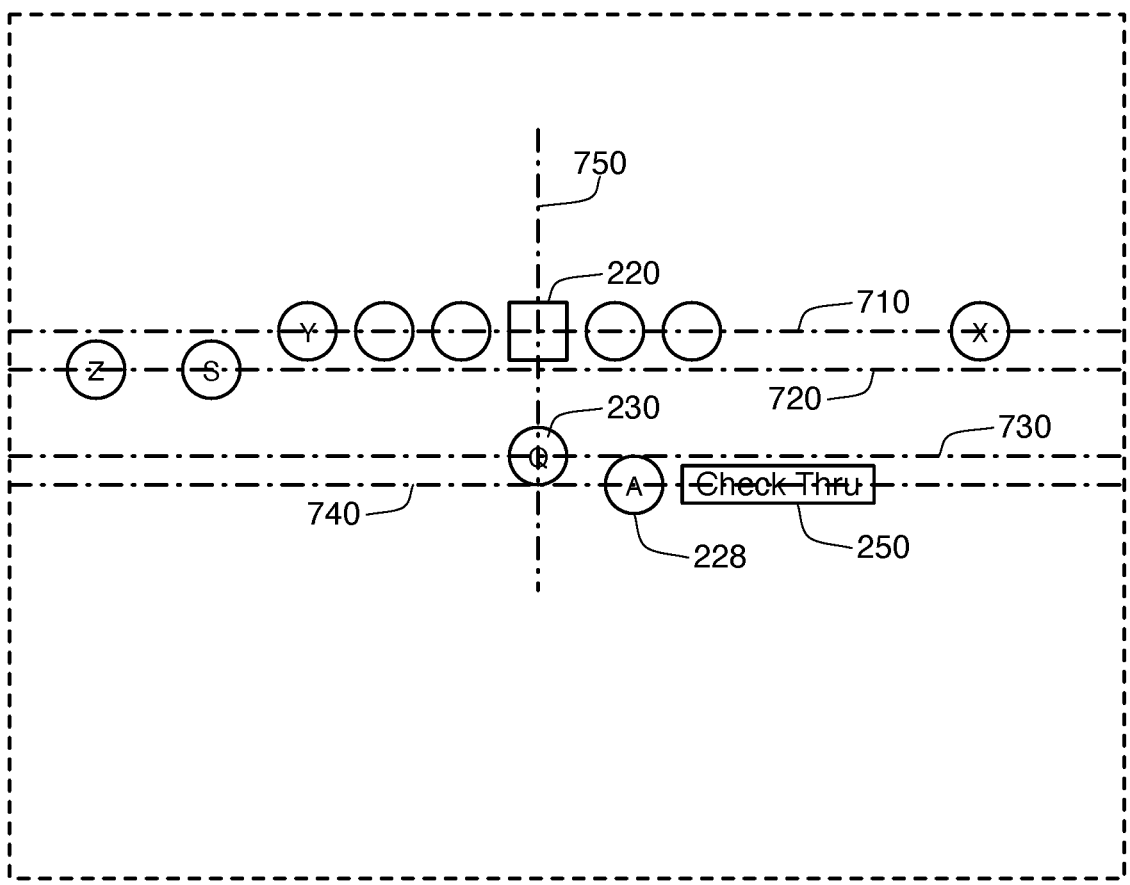
FIG. 7 is a partial view of the input file of FIG. 2 with axial lines.

Step 515 is one of the steps responsible for grouping closed objects together. In Step 515, identified objects 174 are grouped by their Y Position, as shown in FIG. 7. FIG. 7 shows only a portion of those elements found in FIG. 2 in order to simplify this discussion. Dotted/dashed lines 710, 720, 730, 740 show lines that are used to group the offensive player objects 174 based on their position on the Y axis. As shown in this Figure, six objects 174 are on line 710, two objects 174 are on line 720, one object on line 730, and two objects 228, 250 are found on line 740. Step 515 groups these objects accordingly.

Figure 8:
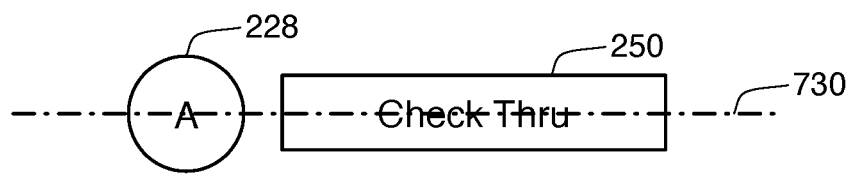
FIG. 8 is a partial view of the portion shown in FIG. 7.

At step 520, these grouped objects 174 from step 515 are further sub-divided into separate groups based on their size. As shown in FIG. 7, the objects 174 on line 710 are all the same size, as are the objects on lines 720 and 730. However, as shown in more detail in FIG. 8, object 228 is taller than object 250 even though both are centered on line 730. Thus, the text box 250 and the circle 228 are both subdivided into separate groups even though they share the same Y-axis position 730. This results in five groups, namely the groups organized by line 710, line 720, line 730, and the groups defined for circle 228 and textbox 250. Note that grouping steps 515 and 520 are applied to all of the elements in input file 150, including the defensive players 200, even though FIG. 7 shows only the offensive players 210-230.

The groupings of steps 515 and 520 are to help identify the overall configuration of the objects 174 as identified by the configuration rules 186. In the context of a football play, for example, step 510 identifies objects 174 positioned on the same position of the Y axis, and then step 515 can be used to identify and exclude objects of a different size on those Y axis locations. In FIG. 7, the offensive player objects are grouped with seven objects 174 on the highest location on the Y axis, and then two at the next lower location, and then one and one (with box 250 being excluded because of its different size). FIG. 7 shows a subset of FIG. 2, where FIG. 2 shows that the defensive players are aligned with six objects at the lowest Y axis location, then one, then one, then two, and then one. With this identification, we can identify a "line of scrimmage" for this play being the horizontal line at the Y axis location halfway between the Y axis location of the group of seven offensive players and the Y axis location of the five defensive players. Once the line of scrimmage is obtained for a football play, more details about the individual objects 174 can be extracted from the configuration rules 186.

At step 525 another grouping step takes place. In this step, the identified objects 174 are grouped by size regardless of their location on the Y axis. Referring to FIG. 2, this results in all defensive players 200 being placed into a group, the offensive players identified by circles and squares (elements 210-230) are in a second group, the small text box 256 is a third group, and the larger text boxes 250, 252, 254 are placed into a fourth group. The line of scrimmage (or any other information about the overall configuration) identified through steps 515 and 520 can be used to separate these groups in step 525.

At step 530, the known overall configuration rules 186 are used to help interpret the identified objects and groups. For example, in the context of a football play, one of these configuration rules 186 will indicate that the largest group of closed shapes identified in step 525 that includes a rectangle (shown as a square) shape is to be identified as the offensive players 210-230. This rule 186 stems from the understanding that in football play diagrams, offensive players 210-230 will generally all have the same size, and the center position is always drawn as a rectangle. In this case, the rectangle/square element 220 is a "key shape," as that shape will inform not only about that particular object 220 but will also provide information about related objects (those objects of the same size). This rule 186 also allows the rectangle Center 220 to be distinguished from other rectangles 250, 252, 254, as the rule requires that the largest group of closed shapes must include the center rectangle 220, and the set containing rectangles 250, 252, 254 is not as large as the set containing the eleven offensive players 210-230.

At step 535, a second object 174 is specifically identified based on its location in the input file 150 relative to the key shape identified in step 530. The rules that help identify this second shape are again the overall configuration rules 186. In the context of a football play, step 535 will identify the closest shape in the group from step 525 that aligns with the X position 750 of the identified center rectangle 220. This is circle 230, and the rules 186 will identify this object 230 as the quarterback. As can been seen in FIG. 7, the circle closest to the center rectangle 220 and vertically aligned (line 750) along the center of the rectangle 220 is the quarterback circle 230. Step 535 makes this determination, and then ensures that this information is stored as part of the object data 174 found in the data store 170.

Now that the center 220 and quarterback 230 have been identified, their positions relative to each other can be used to determine if the offense has been drawn on the bottom or the top of the page. In other words, the orientation of the input file 150 can be determined, which occurs at step 540. If the quarterback 230 is below the center 220, as shown in FIG. 7, then the offense is on the bottom. If the quarterback 230 is above the center 220, then the offense is on the top. The relationship between the relative positions of these shapes 220, 230 to the overall orientation of the input file 150 is found in another of the configuration rules 186. Some drawing types would use other rules 186 to determine orientation in step 540, while still other drawing types would not need to even determine an orientation.

Next, step 545 determines all other information that can be generated about the identified objects 174 based on the information stored in configuration rules 186. In the context of a football play, the server 110 can look to the right and left of the center 220 to identify the guards 218, 222. The server 110 then looks to the right and left of the guards 218, 228 to identify the tackles 216, 224. As explained above, if an object 174 is not found in these positions, a placeholder 410 can be inserted.

The rules 186 will also inform the server 110 how to characterize shapes in groups that do not contain the "key shape." In the context of football plays, the rules 186 inform the parsing engine 114 to identify all short textual elements on the defense side of the line of scrimmage as defensive players. Short textual elements are generally of 3 characters or less (or as defined in user preferences). The defensive side is, of course, opposite the offensive side that is found using the process explained above. The rules 186 will also be able to identify the line of scrimmage as the avg difference between identified center 220 and the closest defense player.

At step 550, the server 110 will identify text elements that have their center close to the center of any of the identified offense players 210-230. In FIG. 2, the letter Z is close to the center of circle 210, S is near the center of 212, Y to circle 214, X to circle 226, A to circle 228, and Q to circle 230. These letters/text shapes are then added to the information stored about the identified objects 174. In other words, object 210 will now be associated with the letter Z in the data store 170.

At step 555, longer textual items such as items 250, 252, 254, and 256 are analyzed. 250, 252, and 254 can be identified as particular types of textual content based on the information about the incoming file 150 found in the configuration rules 186. For example, these rules 186 can specify that centered text near the "top" of the content in the file 150 is title 250, text 252 in the upper right is a description of the play, and text in the lower left 254 are notes. In other embodiments, the rules 186 only identify titles 250 and descriptions 252, and all other text that is not associated with an identified object 174 is considered coaches notes. In still other embodiments, all text that is not associated with an identified object 174 will be coaches notes.

Figure 10:
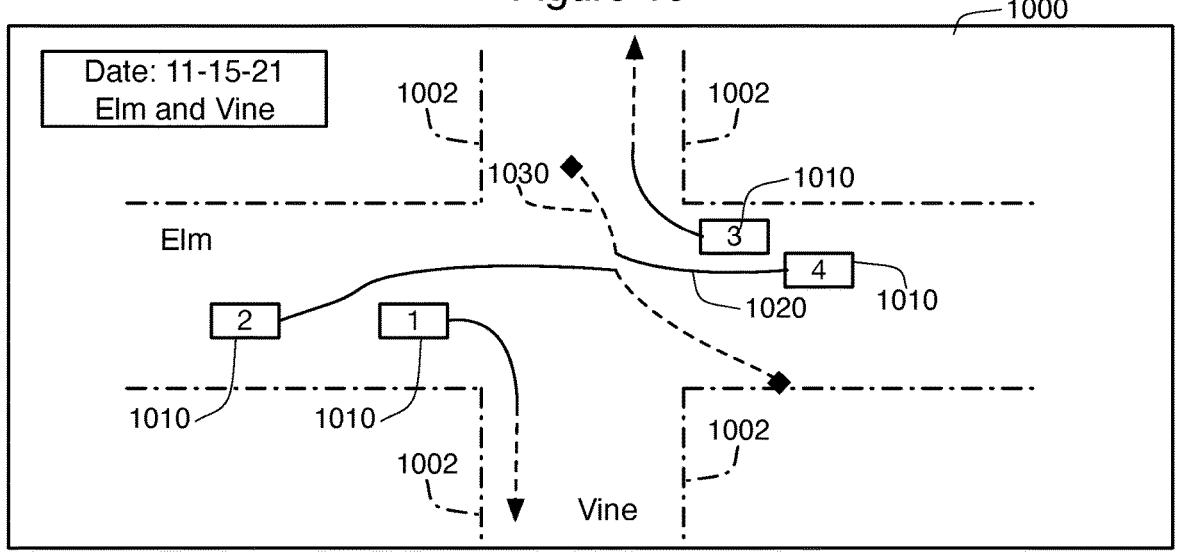
FIG. 10 is a schematic view of a fourth embodiment of an input file.

Step 560 is responsible for identifying appearance and other characteristics that are to be stored in connection with the identified object 174. For example, shading or color can be used on some of the graphic shapes found in the input file 150. Information about this shading or color can be stored in the data store 170 in association with that object. Step 565 detects background information in the drawing that is not related to a particular object 174 but instead defines the setting for the movement identified in the input file. In the example of a football play shown in FIG. 2, the input file 150 may show yard markers, numbers, hash marks, or one or both end zones, which together establish the setting for the movement. In the example of FIG. 10, the setting data constitutes the road edges that identify the intersection. The method 500 then ends at 570.

Alternative Input File Formats and Objects

Figure 9:
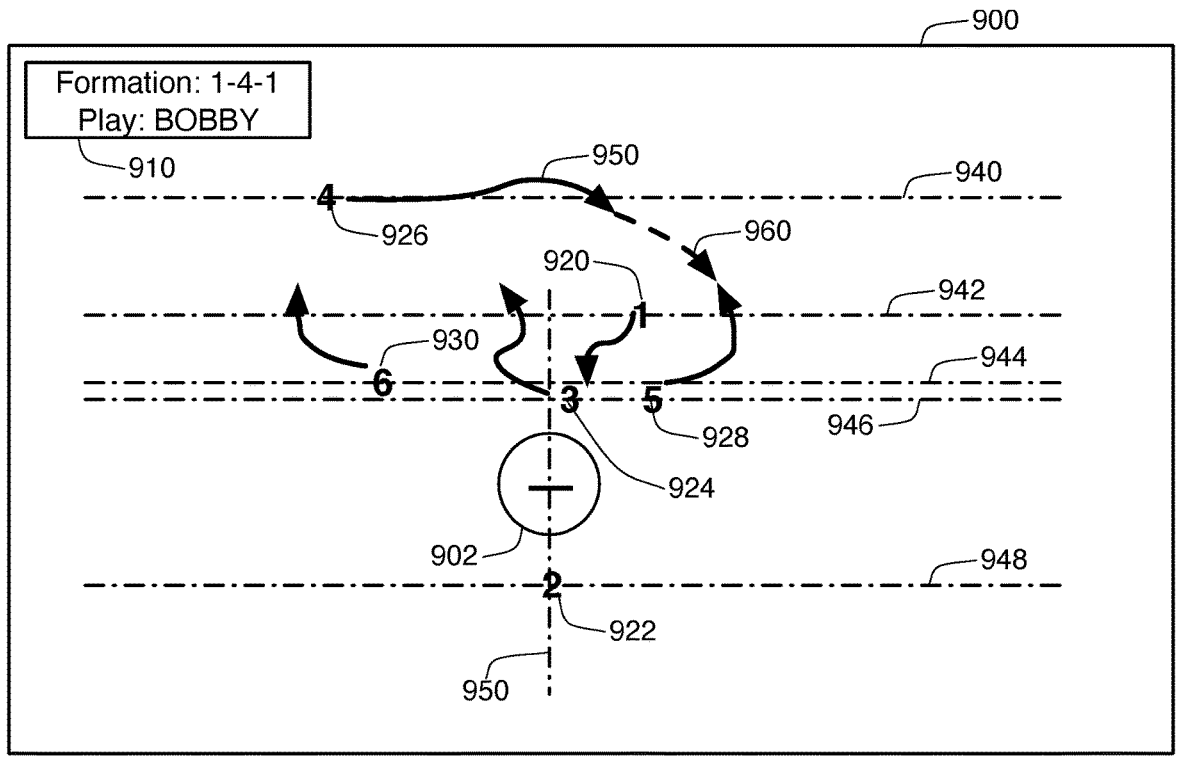
FIG. 9 is a schematic view of a third embodiment of an input file.

FIG. 9 shows an alternative input file 900 that contains a lacrosse play diagram. In this input file 900, text data 910 found in the upper left can be considered metadata for the entire file (containing, for instance, the formation and play name). Objects 920, 922, 924, 926, 928, 930 are identified as single character text strings, which would be specified by the known shape rules 182 applicable for this type of data file 900. The rule 182 may further indicate that the single character text strings should consist only of a numeric digit. Background objects, such as circle 902, define field characteristics. Such objects 902 can be identified by the rules 182 and can be used to position this play diagram to a particular location on a lacrosse field. Movement lines are also found in this file 900, with all of these lines ending in arrow heads.

FIG. 9 shows that some of these lines, such as line 960, can link to the end of another line 950, and that one of these lines 960 can be dashed while another line 950 is solid. The interpretation of these different lines can be governed by the line/movement rules 184 for this file 900, as is described in more detail below. This file 900 can also use horizontal alignment lines 940, 942, 944, 946, and 948 to group objects as well as one or more vertical alignment lines 950. As is the case with the football play in file 150, these groupings can help the parsing engine 114 identify particular objects 174 from the file 900, such as the game positions represented by each object 920-930.

FIG. 10 shows a second alternative input file 1000. In this case, the file 1000 diagrams a street intersection showing the movement of four automobiles 1010 in order to represent a traffic accident. Although this graphical input file 1000 does not relate to a sports play, the same processes can be used by the parsing engine 114 to parse this input file 1000. All that is necessary is for the rules 180 to be modified to relate to this context. The automobiles 1010 may be considered all of one object type, or distinctions might be made between different automobiles depending on their role in the diagramed accident. In similar drawings, automobiles 1010 may be shown in file 1000 as different from trucks or bicycles, and the rules 180 may distinguish these items as different object types. The background street markings 1002 can be identified, for instance, by the type of dotted-dashed line used to represent the street in this file 1000, and this can be set forth in the rules 180. These streets 1002 identify the location of the vehicle objects 1010 in the same way as field mark 902 did in the context of the lacrosse play diagram file 900. Lines, such as lines 1020, 1030, identify movement for the vehicle objects 1010 in the same way as the lines in files 150, 900. In this context, solid line 1020 identifies movement of vehicle 4 before the impact/crash, and dashed line 1030 indicates the movement of that vehicle after the crash.

Movement Parsing Method

FIG. 2 shows that each of the offensive player elements 210-230 are physically connected to line sections, such as line section 240 and arrow 242 (note that line and route "sections" were referred to as line and route "segments" in the incorporated documents). In most football plays, lines such as arrow 242 are associated with a single identifiable player based on the location of the base of the arrow 242 (the base being the opposite end of the arrow 242 as the arrowhead). These lines indicate movement. Similar lines were shown as lines 950, 960 in the lacrosse play file 900 (that relate to the movement of individuals) and lines 1020, 1030 in the automobile crash file 1000 of FIG. 10 (that relate to the movement of inanimate objects, namely automobiles). The parsing engine 114 is responsible for identifying and interpreting these lines 240, 242, 950, 960, 1020, 1030 and associating them as identified movement 176 for one of the identified objects 174. In the examples shown in FIGS. 2, 9, and 10, different movement instructions are provided for different objects in the Figures.

Figure 11:
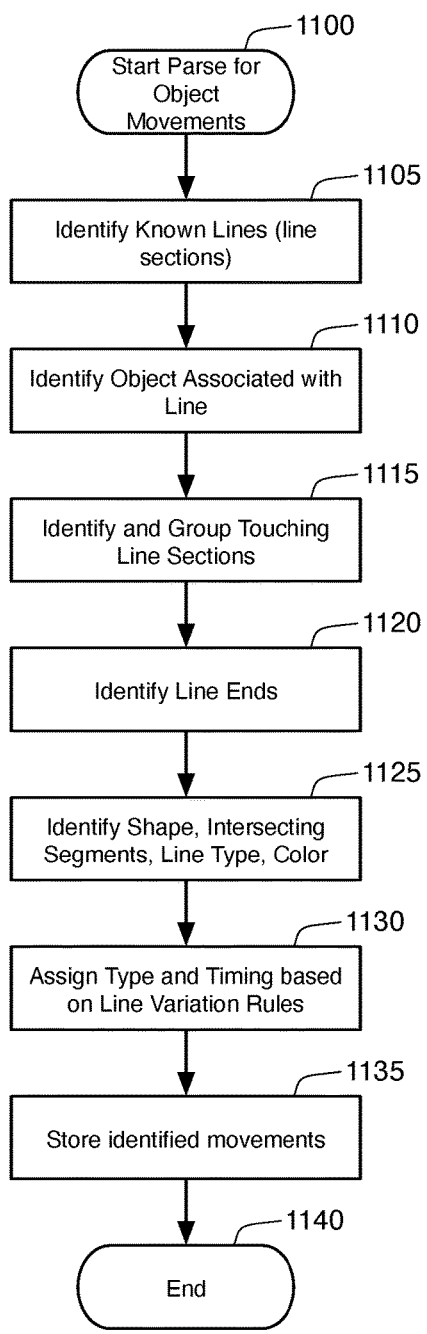
FIG. 11 is a flow chart showing a method for parsing object movement.

The parsing engine 114 accomplishes this through the method 1100 shown in FIG. 11. The first step 1105 of this method is to locate any lines or line sections that start near an identified object 174. It should be remembered that the lines or line sections in the input files 150, 900, 1000 have been added to these input files to act as movement instructions for their associated objects.

Figure 12:
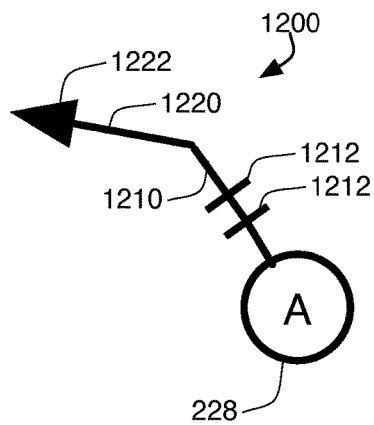
FIG. 12 is a schematic view of a first object and an associated movement line.
Figure 13:
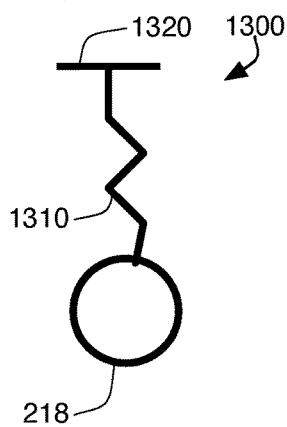
FIG. 13 is a schematic view of a second object and an associated movement line.
Figure 14:
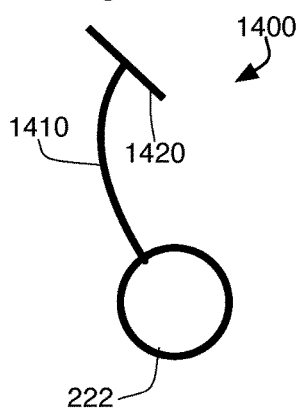
FIG. 14 is a schematic view of a third object and an associated movement line.

When identified, that line section is the associated with the object to which it is attached or is nearest in step 1110. FIGS. 12, 13, and 14 show object and line groupings 1200, 1300, 1400, respectively. In FIG. 12, line section 1210 is connected to previously identified object 228. Thus, this line section 1210 will be associated with object 228. Similarly, crooked line section 1310 in FIG. 13 is associated with identified object 218, and the curved line section 1410 is associated with object 222 (as shown in FIG. 14). Although each of these examples shows line sections near an offensive player 210-230 in FIG. 2, line sections could also be associated with defensive players 200. Such defensive line sections would also be identified in step 1105.

At step 1115, the line sections 1210, 1310, 1410 are traced to their ends, with the end being that part of the line section furthest from the identified object. In some cases, the end of the line section can then be associated with the start of another line section, as is the case with line section 1210 in FIG. 12. Line section 1220 starts at the end of line section 1210, making these two sections 1210, 1220 "connected line sections." Although this isn't the case in FIG. 12, this second line section 1220 could end at the start of a third line section, which may, in turn, end at the start of the fourth line section, and so on. The process of tracing touching line sections in step 1115 is continued until no more line sections are found. All of the touching line sections found in this manner are then grouped together (as a group of line sections).

Each line section group (which can consist of multiple line sections 1210, 1220, or a single line section 1310 or 1410) is then examined by method 1100. At step 1120, shape of the end is noted. Line grouping 1210, 1220 ends at arrowhead 1222, while line sections 1310 and 1410 end with perpendicular line section 1320, 1420, respectively. At step 1125, the shape of the grouping and line sections themselves are examined. For instance, line sections that traverse other line sections are noted, such as the line sections 1212 that traverse line section 1210. The shapes of the section groupings are also noted. Line section 1310 has a zigzag shape, while line section 1410 is curved. The color, width, and line type (solid, dashed, etc.) are also noted.

The information gathered at steps 1120 and 1125 is then parsed at step 1130 by comparing this data to the movement rules 184 in the rule set 180. FIG. 15 shows some sample content for these rules 184, with the line details from steps 1120, 1125 showing as the input 1510 to the rules 184, and the output 1520 defining the type of movement that is being represented. For example, the rules 184 shown in FIG. 15 indicate that a solid line represents movement of type-1, and a dashed line represents movement of type-2. A zig zag line shows movement of type-4. The line endings also are found as inputs into the rules 184, with an arrow ending, such as ending 1222 in FIG. 12, indicating that the movement is modified by modifier-1. A line section line end, such as endings 1320 and ending 1420, indicates a modifier-3 applies.

The interpretation of these inputs depends on the content of the rules 184, which will be based on the type of file 150, 900, 1000 being input. In a football play 150, for instance, the different movement types in results 1520 may represent the timing of the movement, with a dashed line indicating movement before the snap and a solid line indicating movement after the snap. An arrowhead ending may indicate continued movement in a general direction, while a line section line end indicates blocking. In some cases, the rules 184 may be dependent upon the associated identified object 174, with line types or endings having different meaning depending upon the associated object 174.

In a lacrosse play file 900, the dashed line 960 may indicate passing of the ball. In the automobile crash diagram file 1000, the solid line means movement before the crash and dashed lines indicate movement after the crash. The arrow heads in diagram file 1000 indicate continued movement, while the box ending indicate final resting position after the crash.

After the rules 184 are used to parse the line data into movement data, step 1135 stores the movement data as identified movements 176 in the data 170. Each identified movement 176 is stored in association with a particular identified object 174 to represent movements and actions of that object over time. The method then ends at step 1140.

Populate Card Object

The above descriptions and related figures show that the identified objects 174 and the identified movements 176 are stored as data elements in the data store 170. However, it is not necessary that these elements 174, 176 be permanently stored in the data store 170, or even stored within the separate data store 170 at all. That is because the data represented by the objects 174 and movements 176 will be incorporated in the card object 178 that will be stored in the data store 170, meaning that separate storage of objects 174 and movement 176 will be redundant.

FIG. 16 shows the method 1600 used by the parsing engine 114 for populating the card object 178. This object 178 is based on a class definition that, when instantiated, incorporates all elements of a play defined by the input file 150. The goal of this method 1600 is to take the data found in the identified objects 174 and identified movements 176 and use it to populate this data object 178.

Figure 17:
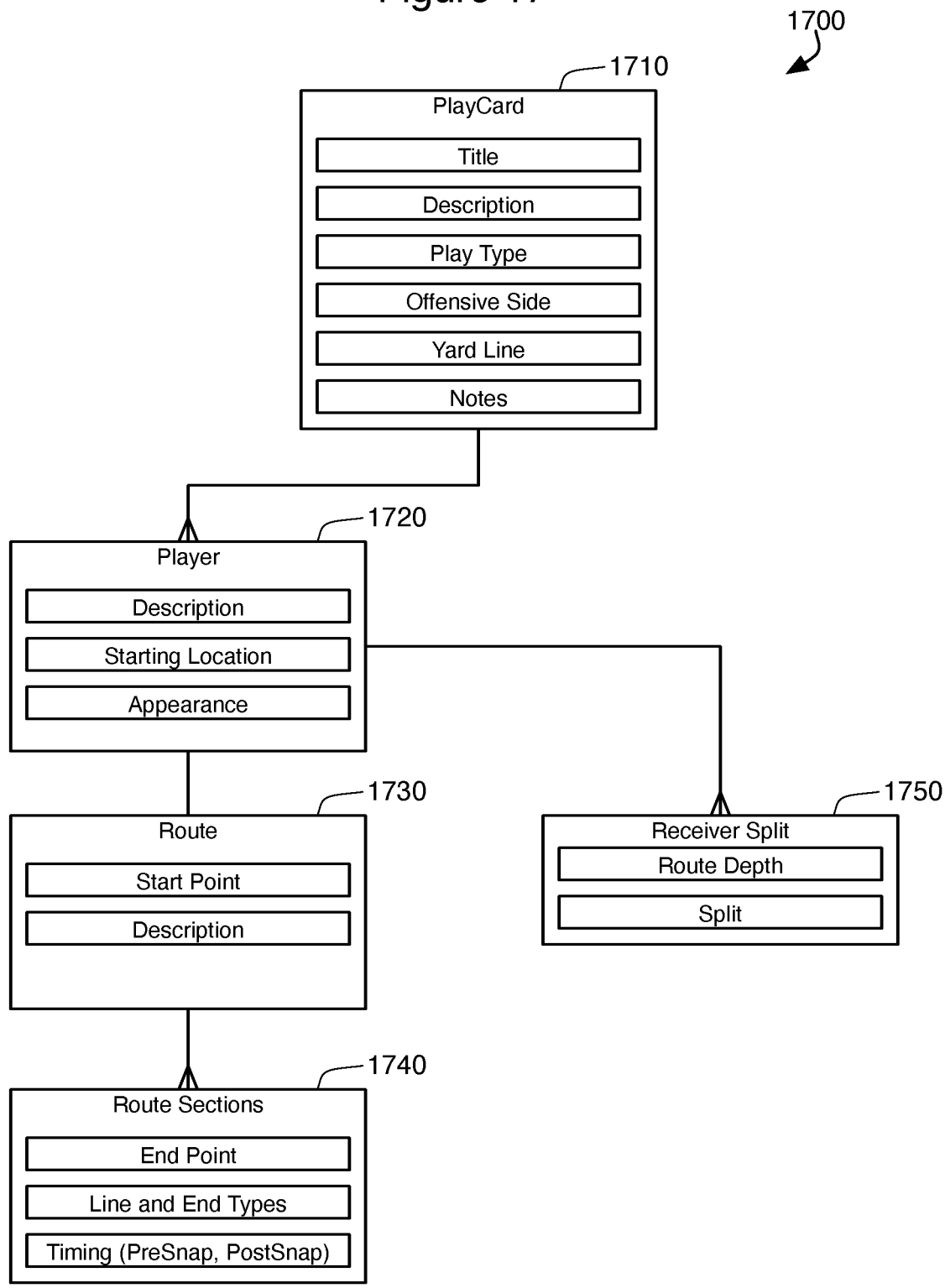
FIG. 17 is a schematic view of a first embodiment of a card data entity.

FIG. 17 shows one such structure 1700 for the card object 178. This structure 1700 is shown as a plurality of individual data objects 1710-1750, although the structure could easily be implemented as separate tables in a relational database. Consequently, each of the separate objects 1710-1750 shown in FIG. 17 can be generically considered separate data entities. Furthermore, there is no requirement that the card object 178 be implemented exactly as shown in FIG. 17 (or in FIG. 18), as alternative configurations of the data entities could be implemented with equivalent effect.

The primary data entity defining this structure is the playcard object 1710, which contains information about the input file 150 as a whole. As can be seen in FIG. 17, the playcard object contains textual information about the input file, including the title, description, and notes (which were determined at step 555, as explained above). Step 1605 populates this data in the playcard object 1710. The playcard object 1710 also contains information about the formation and overall type of play, which was determined by examining the grouping and movement of the plurality of objects 174 at step 320 and this information is populated by step 1610. Step 1615 adds data concerning the orientation or offensive side (determined at step 540) to the playcard object 1710. The setting or overall position of the play on the playfield can be determined by examining background data, such as yardage or field marking in a football play, similar to the field marking 902 shown in the lacrosse play.

Step 1620 populates a plurality of player objects 1720 based on the already identified objects 174. This will include both offensive and defensive players. The information about each player held by the player object 1720 includes the description of the player, such as their role or position on the team, and their starting location on the play, as indicated by the physical position of the graphic element representing the player in the input file 150. Their appearance is also recorded, which will be based on the appearance of that graphic element in the input file 150. The appearance may indicate, for instance, whether the player 1720 should be shaded or have a particular color.

Step 1625 populates the route 1730 and route section 1740 objects based on the identified movements 176. Each movement for a player 1720 will have a single route object 1730, and the route object 1730 will point to one or more route sections 1740. The route object 1730 identifies the starting point and descriptive information about the route. The descriptive information could be retrieved from identifying textual information associated with the lines and arrows in the input file 150. Since the route object 1730 identifies only a starting position, it defines no movement. The movement is defined by the route section objects 1740, which is why at least one section 1740 is required for each route 1730. Each section 1740 is associated with either the original route object 1730 or a previous section 1740. It is possible to merely identify end points for each route section 1740 since each section 1740 is assumed to start at the ending point of the previous section 1740 (or at the starting point of the route 1730). Each section 1740 will contain additional information determined about the movement from applying rules 184 through method 1100. For instance, if a section terminates in a line section ending, the route section 1740 will indicate that the section will end in a blocking position. Movement types and timing are also identified through method 1100 and added to the route section object 1740. A route section might also be associate with type and timing information. The timing information may indicate which movement sections take place before an event, and which ones occur after the event. In the context of football plays, for example, the timing information can be associated with movement that takes place before the snap of the football (PreSnap) or after the snap (PostSnap). In other context, the timing can be associated with movement that takes place before an event (PreEvent) or after the event (PostEvent).

In some embodiments, the input drawing 150 represents a real-life scenario such as players on a football fields (in FIG. 2) or cars at an intersection (in FIG. 10). But the drawings 150 itself does not accurately place the objects 174 in that drawing 150 perfectly to scale. For instance, the player icons in FIG. 2 may be larger than actual football players. The drawing 150 in FIG. 2 contains useful information about the relative position of the individual players, but the actual location of a player on the field may not be drawn to scale. In the context of a football play, horizontal information about the placement of wide players can be identified by their "split." This horizontal information can be based upon specific locations on a field, such as relative to the hash marks or to the numbers on the field. A "+3" value in a split might be three yards outside of the hash marks, or outside the numbers.

Because the input drawing may not be to scale, it may be necessary to extract or guess about the horizontal position or split of an object 174 in the drawing. Sometimes the data can be extracted from metadata embedded into a drawings 150, but other times the horizontal position is obtained through approximation based on what is known about the drawing. For example, the hash marks might be displayed in the input drawing 150 (not shown in FIG. 2), and, if the drawing 150 is actually to scale, the horizontal position in the real-world context can be examined through analysis of the horizontal position in the drawings. In another case, the drawing is not to-scale, but hash marks are included, and approximations are relatively easy to make. In a third case, no hash marks are drawn, and approximations comprise simply a best guess as to the "split" of the objects 174.

The split of the objects 174 are stored in the embodiment shown in FIG. 17 in the ReceiverSplit class 1750 at step 1630. The object 174 may have a different split value at different moments in time, such as at the beginning of the play, and at the snapping of the ball. Thus, multiple splits 1750 can be assigned to a single object 174. There is a natural relationship between the split data 1750 and the starting location found in the player object 1720 and the route data found in objects 1730 and 1740. The "points" in these data objects 1720, 1730, 1740 can be considered to contain both X and Y coordinates that obviate the need for separate split data 1750.

In some embodiments, the split data 1750 contains textual information in a matter that is useful for the user of the system 100, which may find it helpful to know that this player is +3 from the numbers as opposed to having the system simply accurately tracking the player position without such textual split data. The method 1600 then ends at step 1635.

Figure 18:
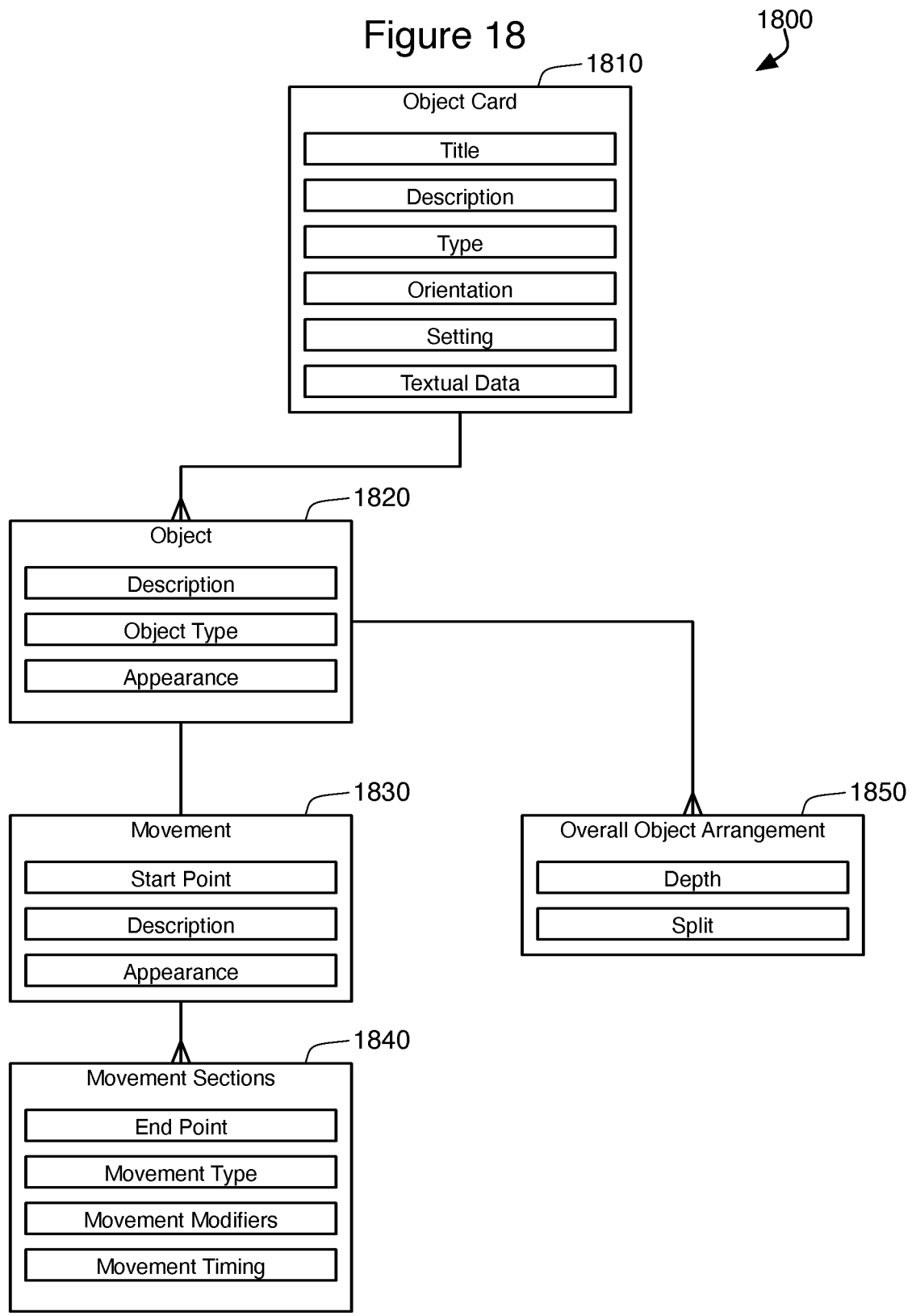
FIG. 18 is a schematic view of a second embodiment of a card data entity.

FIG. 18 shows a different object structure 1800 that is more generic than the object structure 1700 used to define football plays. This structure 1800 is still very similar, with an object card 1810 containing information about the input file 900, 1000, as a whole. Instead of players, the object card 1810 is associated with a plurality of generic objects 1820 which are populated using the identified objects 174. In the context of input file 1000, for example, these objects 1820 would represent automobiles. The objects 1820 are assigned to a movement object 1830, which is related to a plurality of movement sections 1840 in the same way each player 1720 was assigned to a route object 1730 and at least one route section 1740. Element 1850 is an object that represents the specific, real-world object location in the same manner as element 1750.

Transform Engine and Method

Figure 19:
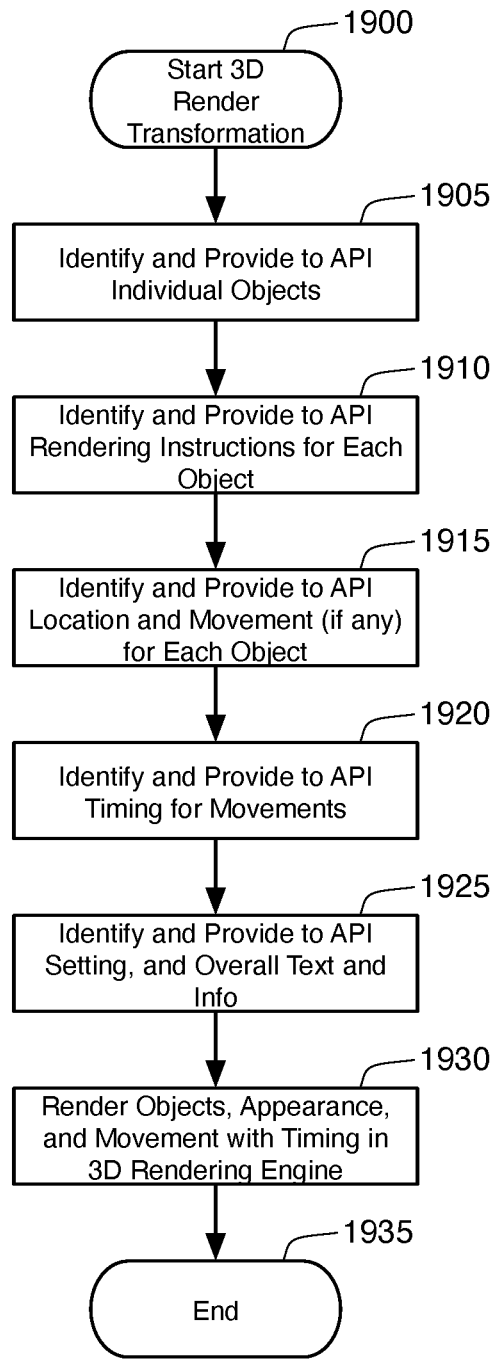
FIG. 19 is a flow chart showing a method of rendering a parsed vector graphics file.

Once the card object 178 is created and populated, the transform engine 116 is responsible for taking this object 178 and creating output files and data 192, 196. The method 1900 for performing this transformation is shown in FIG. 19. This method 1900 is made easier because the highly structured data of the card object 178 that separately defines a plurality of objects 174 and movements 174 specific to those objects 174. The method 1900 shown in FIG. 19 assumes that the transform engine 116 will provide API data 192 through an API interface of a 3-D rendering engine 190. It should be clear to one of ordinary skill that the transform engine could easily transform this data in the object 178 to any format or platform, included ByteCubed, 3D Models, or even back into 2-D formats such as Visio or PowerPoint.

The process of parsing and transformation opens up new possibilities for rendering based on these different downstream graphic engines. ByteCubed, for instance, could read and display an SVG image directly, but if presented only the SVG image the software will not understand what image elements represent players in a play and what image elements represent a route for an individual player. The parsing engine 114 and the generated card object 178 allows the transform engine 116 to present data 192 to, for example, the ByteCubed graphics engine 190 in a much more effective manner, where individual players are uniquely identified, and movement image elements are transformed into movement in the ByteCubed software.

The method 1900 start at step 1905, where the transform engine 116 identifies the individual players 1720 or objects 1820 in the card object 178 and presents them at API data 192 to the graphics engine 190 as individual objects. Step 1910 allows the transform engine 116 to define the rendering instructions that define the appearance for each object in the 3-D rendering engine 190 according to the rules governing the API input data 192. The color or shading for each object 1720, 1820, for example, can be customized based on the color or shading of the 2-D object 174 identified by the parsing engine 114 in the input file 150, 900, 1000. Similarly, the 3-D shape of the individual objects can be based on the 2-D representation of the objects in the input file 150, 900, 1000. For instance, circles could appear as spheres, squares as cubes, and rectangles as cuboids. The heights of these objects could be based on the relative widths and lengths of the representation, such that circles and squares become perfect spheres and cubes, and rectangles become cuboids of a height equal to their shortest side. 3-D representations that bear no resemblance to the 2-D graphic shapes in the input file 150 are also possible. If input file 1000 is known to represent automobiles, for example, a 3-D representation of an automobile could be specified in the API data 192 instead of a cuboid. The shape of the objects as rendered could also be based upon the object types assigned to the objects by the parsing engine 114 regardless of the color or shape of the object in the original 2-D input file 150, with different object types being shown in different colors, or shapes, or both. Method 1900 does not create these representations, as they are created by the 3-D rendering engine 190. Rather, the method 1900 merely provides instructions to the 3-D rendering engine 190 (such as 'render a blue sphere of these dimensions' or 'render a red automobile' with these specifications), with the details determined by the 3-D rendering engine 190.

In one embodiment, step 1910 is used to change the appearance of an object 174 (players 1720 or objects 1820) depending on the current route or movement section 1740, 1840. For example, a football player object 1720 might be represented using a first 3-D graphic during a first route section 1740, and a second 3-D graphic during a second route section 1740. This could be based on the movement types for the sections 1740, 1840 as identified by rules 184. The graphic could also change at the end of the section 1740, 1840 when the timing for that section has ended, and this change could be governed by the section end. A section with a blocking line section end, such as sections 1310 and 1420 with ends 1320, 1420, respectively, could cause one 3-D graphic to be displayed during movement, and another to be displayed showing a blocking character or graphic at the end of the movement. It is the parsing engine 114 and the resulting card object 178 that allows these types of creative possibilities to be implemented by the transform engine 116.

At step 1915, location information is provided for each object identified in step 1905, and movement parameters are provided for one or more of the objects. The movement parameters are based on the routes 1730 and route sections 1740 (or movements 1830 and movement components 1840) identified in the card object 178. This movement will likely be limited to movement in a 2-dimensional (2D) plane since this movement is based on elements in a 2-D graphic input file 150. However, this does not need to be the case. For example, the input file 150 may represent movement of one or more airplanes. Each line section/arrow shown in the input file 150 may show a 2-D path, but the ending of the sections may include textual data (or embedded meta data related to the graphic object) that specifies altitude at the end of that section. This brings a third dimension into the identified movements 176, which could then be stored into the card object 178. In this context, the movement parameters provided at step 1915 will define 3-dimensional movement patterns for the identified objects.

At step 1920, the transform engine 116 will provide timing information for the movement data provided at step 1915. As explained above, separate timing information can be stored in the individual route sections 1740 or movement components 1840. This timing information will then be used by the 3-D rendering engine 190 to control the timing of the rendered movement of each object. And, as explained above, this timing information could be used to control the 3-D representation of the objects as they move from section 1740, 1840 to section 1740, 1840.

At step 1925, textual data, setting or background data, and other information can be provided to the 3-D engine 190 via the API data 192. This data may be displayed by the engine 190 next applied to a rendered player 1720 or object 1820, or even on the player 1720 or object 1820 itself. Alternatively, the data may relate to the overall playcard 1710 or object card 1810, and the engine 190 can display the text as part of the environment for the rendered objects.

At step 1930, the 3-D graphics engine 190 takes the API data 192 and renders the players 1720 or objects 1820, alters their appearance as indicated by the transform engine 116, places them in the defined setting, and renders their movement according to the submitted parameters. Routes 1730 for each player 1720 or movement 1830 for each object 1820 will cause the 3D representations of players and objects to move from their initially assigned positions at the appropriate times. Information about the setting will be displayed (such as the yard line and play title from FIG. 2, or the intersection from FIG. 10) to provide context to the objects and their movement. The method 1900 then ends at step 1935.

In this way, the transform engine 116 converts the card data from FIGS. 17 and 18 into a format the 3-D engine 190 can render. This system 100 thus allows functionality for users to build 2D images in relatively simple graphics programs, such as Microsoft Visio & Power Point, and then have these images transformed to a 3D experience that will enhance the end product and provide a new layer of seamless technology that does not currently exist.

System and Methods for Multiple-Segment Graphics Transformations

Figure 20:
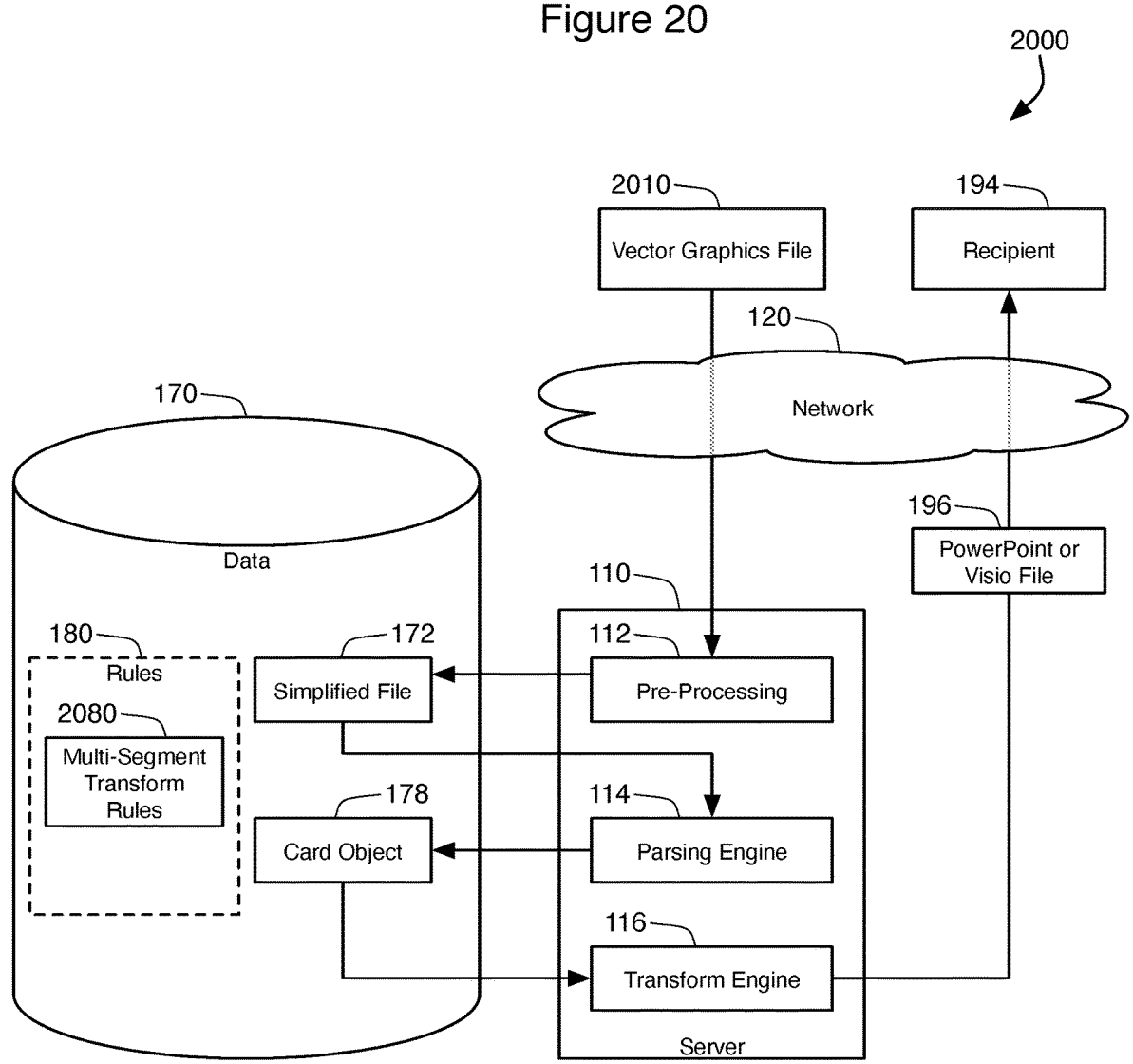
FIG. 20 is a schematic view of a second embodiment system for parsing a vector graphics file.

FIG. 20 shows a system 2000, which is an example embodiment of system 100 shown in FIG. 1. System 2000 is an implementation designed to parse a vector graphics file 2010 having a first background component, and to transform the parsed objects through a multi-segment transformation onto a second background. In the example described herein in connection with FIGS. 20 through 31, the vector graphics file 2010 is a PFF SVG formatted file created by Pro Football Focus, which was first discussed above.

The system 2000 in similar to system 100, but in system 2000 the rules 180 comprise only those multi-segment transform rules 2080 used to parse the graphics file 2010. As explained above, rules 2080 (like rules 180) can be implemented in a table-like format, like those shown in FIGS. 6 and 15. These rules 180 can also be hardcoded into programming that operates on the server 110. In the following example, the flow charts shown in FIGS. 26, 27, 28, 29, and 31 implement the multi-segment transform rules 2080 for the PFF vector graphics file 2010. In this system 2000, a pre-processing engine 112 still creates a simplified file 172, and a parsing engine 114 still populates the card object 178. In this embodiment, it is not necessary for identified objects 174 and identified movements 176 to be separately stored in the data 170. This data can be temporarily stored in the memory of the server 110 while generating the card object 178. The above-described embodiments also could store the identified objects 174 and movements 176 in internal server memory, but FIG. 20 shows this explicitly. The card object 178 is then transformed by the transform engine 166 into a 2-D graphics file having a different background, such as a Visio file 196 or a PowerPoint file (also included in element 196 in FIG. 20).

Figure 21:
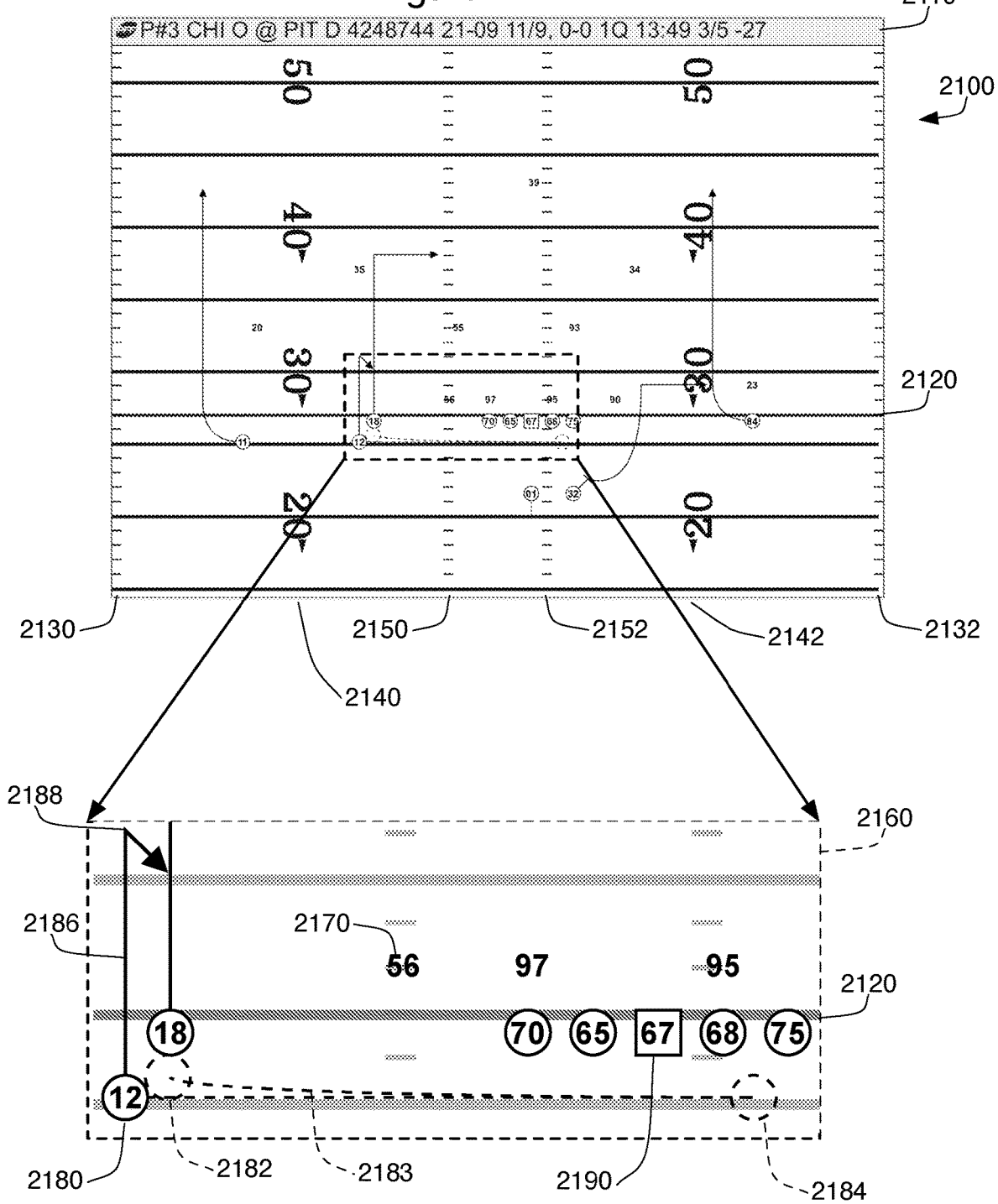
FIG. 21 is a schematic view of a first format graphics file with an enlarged portion.

FIG. 21 shows an example 2100 graphics file 2010. More particularly, this figure shows the graphical representation of SVG PFF file 2100. Because of the size of some elements of this representation of file 2100, an enlarged portion 2160 is also shown in FIG. 21.

This file 2100 shows the detail of a professional football play played in a real game. The identification of the play and the relevant game information is shown in banner 2110, which identifies the teams played, the date, the time within the game, the offensive and defensive teams, the yardage and down information, and a unique identifier assigned by Pro Football Focus to the play. In additional to players and movement of players, the file also shows a line of scrimmage 2120, and various markings on the field that show where the players were positioned on the field of play. In particular, the left and right sidelines 2130, 2132, respectively; the left and right "numbers" 2140, 2142; and the left and right hash marks 2150, 2152 are all shown as part of the background of the play. These markings 2130-2152 are important for understanding the positioning of the players and the movement of the players on the field, and form part of the initial background of the input file 2100.

The enlarged portion 2160 shows offensive players as numbers surrounded by a square (indicating the center position player 2190) or circles (all other positions). Defensive players, such as player 2170 (number 56), are shown as numbers that are not contained within circle or square shapes. Offensive player 2180 is shown with multiple additional markings, including a first position 2182 and a motion path 2183 that includes an intermediate position 2184. The position and movement of this player 2180 before the ball was snapped on the play is represented by these dashed lines and shapes 2182, 2183, 2184 in file 2100, with the first position 2182 being considered a "PreSnap" (or, more generically, "PreEvent") position 2182. The position of the circle 2180 with the solid (not dashed) outline shows the player position at the time the ball was snapped (the "AtSnap" or "AtEvent" position). The movement of this player 2180 after the ball was snapped is shown in a solid line 2186. This line 2186 shows the route of the player 2180, which indicates that the player moved down field past the line of scrimmage 2120 to position 2188, at which point the player 2186 changed course and started moving infield and back toward the line of scrimmage 2120. The position of point 2188 downfield where the route 2186 changes is considered the depth position, and the distance from the line of scrimmage 2120 to that depth position 2188 is the "depth" 2188 of the route 2186, which in this case is four yards. Both the motion PreSnap path 2183 and the passing PostSnap path 2186 are considered "routes" for the player 2180, one (2183) being a motion route and the other (2186) being a passing route (also referred to simply as the route).

One of the primary benefits of parsing file 2100 in the manner described herein is that the data contained within it can be transformed and converted into a new format as desired by a user. Frequently, coaches will be interested in presenting the information found in the file 2100 to the players that they are coaching. They prefer, however, that the data be presented in a preferred manner that will differ from team-to-team or even coach-to-coach. In most cases, for instance, a coach will prefer that the player positions and route information be presented on a background image that is not identical to the background image of the original file 2100. While file 2100 may present player sizes similar to actual size players on a field, and while the field size and relative dimensions are true-to-life, this is not preferred by most coaches. Rather, their preference is usually that player icons (such as the circles and squares) and the numbers (or letters) be enlarged to make seeing the players easier when presented during a coaching session. Furthermore, the area between the hash marks 2150, 2152 is generally stretched and enlarged in the preferred backgrounds, meaning that other areas of the field are compressed.

Figure 22:
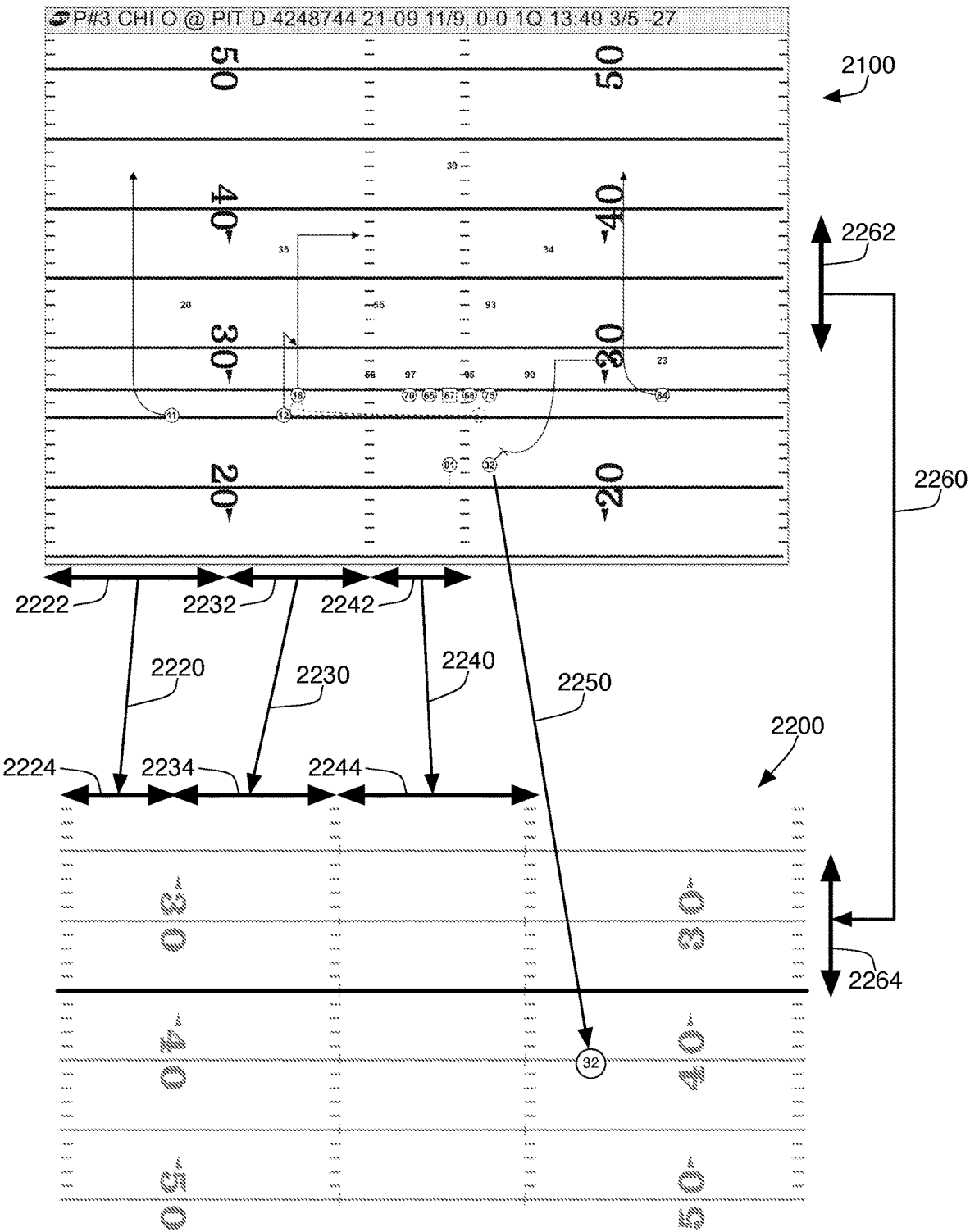
FIG. 22 is a schematic view of the first format graphics file of FIG. 21 showing transformation requirements for a first selected background image.

FIG. 22 shows the file 2100 and its background in comparison to an example background image 2200 that might be preferred by a user. As can be seen in this figure, the area or "segment" 2242 between the hash marks 2150, 2152 is enlarged, and this enlargement is represented in FIG. 22 by an enlargement transformation 2240. This can be considered a first transformation in a multi-segment transformation, where the enlargement transformation enlarges the original segment 2242 (the dimension between the hash marks 2150, 2152) in the input file to the target segment 2244 (the space between the hashmarks in the new or target background image 2200). The segment 2232 between the hash marks 2150 and the numbers 2140 might be enlarged or compressed between the original file 2100 and the background image 2200. In this case, this segment 2232 is slightly enlarged into the target segment 2234 as represented by transformation 2230, which represents a second segment transformation between the original segment 2232 and the target segment 2234. The area (segment 2222) between the numbers 2140 and the sidelines 2130 is compressed according to transformation 2220 to the target segment 2224. In the preferred embodiment, the two left-side transformations 2220 and 2230 are repeated identically on the right-side of the input file 2100 and the target background image 2200.

These segment transformations 2220, 2230, 2240 are internally linear, but obviously differ from each other. Coaches prefer the background image 2200 for presenting plays during coaching sessions because it enlarges the area of the pitch where most players will be found (the central areas), which makes subtle shifts and movements easier to see.

Some segments can be defined as positions along a coordinate system. File 2100, for instance, can be considered to have an x-axis running left to right, and a y-axis running top to bottom. These axes may be similar to pixel (picture element) locations within the file 2100 itself, as pixels in a 2-dimensional image are frequently located using an x and y position. Because the number of locations (or pixels) that exist along an axis can vary from file to file, segments 2222, 2232, 2242 can be identified through percentages. For example, the location of the first segment 2222 in file 2100 may be identified as occurring at a percentile location extending from 0% to 22% of the entire X-axis of the input file 2100. The target segment 2224 for the relevant transformation 2220 might extend from 0% to 14%. The linear transformation 2220 of locations in this segment can then be defined by this change in the width of the segment (fourteen divided by twenty-two) and then positioned relative to the location of the target segment 2224 in the resulting file 2200. Vertical transformations 2260 can be similarly considered using y-axis coordinates and heights of the segments before and after transformation.

The system 100 will be informed of the locations of the sidelines, numbers, and hash marks on the desired background image 2200. In one embodiment, a user will upload the background image 2200 and will identify (such as by pointing and clicking) where these items exist on the uploaded image 2200. In other embodiments, pattern recognition will be used to identify the sidelines, the line of hash marks, and the line of numbers with arrows in the uploaded FIG. 2200. From these locations, and from the known locations 2130, 2132, 2140, 2142, 2150, 2152 of these elements on the preferred input image 2100, the linear transformations 2220, 2230 can be determined.

Users indicate a preference that the objects (the players and movements) shown in the original file 2100 be transformed to be presented on the preferred background image 2200, while still having all the useful information found in file 2100 being preserved and presented as faithfully as possible. This requires separate transformation segments 2220, 2230, 2240 for objects found in each of these separate segments. Furthermore, as mentioned earlier, coaches prefer to enlarge the size of the icons and fonts identifying player locations. Such enlargement is represented in FIG. 22 as transformation 2250 of the icon for player 32. This enlargement (which can itself be considered a separate transformation) may further distort how and where player data extracted from the original file 2100 is to be presented on the background image 2200.

Another transformation segment relates to the transformation 2260 in the Y dimension. In the context of this description, the X dimension can be considered the horizontal dimension in the Figures, and the Y dimension can be the vertical dimension. As a general matter, the upper left corner of an SVG image will be considered the origin point, with X, Y coordinates of 0, 0. As for transformation 2260, ten yards in the original background of file 2100 (original segment 2262) is slightly smaller than ten yards in the preferred background image 2200 (target segment 2264), thus requiring a Y-dimension transformation 2260. This transformation 2260 differs from, and is therefore a separate transformational "segment" than, any of the three X-dimension transformation 2220, 2230, 2240. Thus, an original position on the original file 2100 can be located against the new background image 2200 by identify the appropriate segments 2220, 2230, 2240, 2260 applicable to the original position, applying the appropriate transformations 2220, 2230, 2240, 2260, and the adjusting for the locations of these segments 2224, 2234, 2244, and 2246 on the new background 2220. For example, player 32 that is subject to transform 2250 is found in a X-axis segment between the right hash 2152 and the right numbers 2142, and therefore will be subject to a transformation similar to transform 2230 to position the player on the X-axis in the new background image 2200 relative to the right hash. The Y position of this player will utilize transformation 2260 to determine the Y-axis distance from the line of scrimmage (show at yard line 35 in FIG. 22). The rules 2080 that utilize the processes and procedures described above to allow of this parsing, extracting, transforming, and presenting of this information are described below.

File 2100 is a vector graphics file such as an SVG file. An SVG file is able to describe the graphical content of the file 2100 (as shown in FIGS. 21 and 22) using tagged text. Tagged text places data within tagged identifiers, such as between an opening "<text>" identifier and closing "</text>" identifier. In this description, the data defined by these tagged identifiers will frequently be referred to as objects. By placing one object inside another object, hierarchies including children and parent objects can be created.

FIG. 23 shows a segment 2300 of the text that defines file 2100. As explained above, a pre-processing engine 112 can accept this file 2100 as input and then output a simplified file 172. This simplified file 172 can take the form of a WPF file that utilize XAML (the eXtensible Application Markup Language). FIG. 24 shows a segment 2400 of the XAML produced by the WPF version of file 2100. As can be seen in the comparison of segment 2300 and 2400, the same data can be found, but in different formats, in both of these tagged-text based graphics file formats. The illustrations below will use the XAML file contents (including segment 2400) when analyzing file 2100, but the original SVG file (shown in segment 2300) could also have been used.

Figure 25:
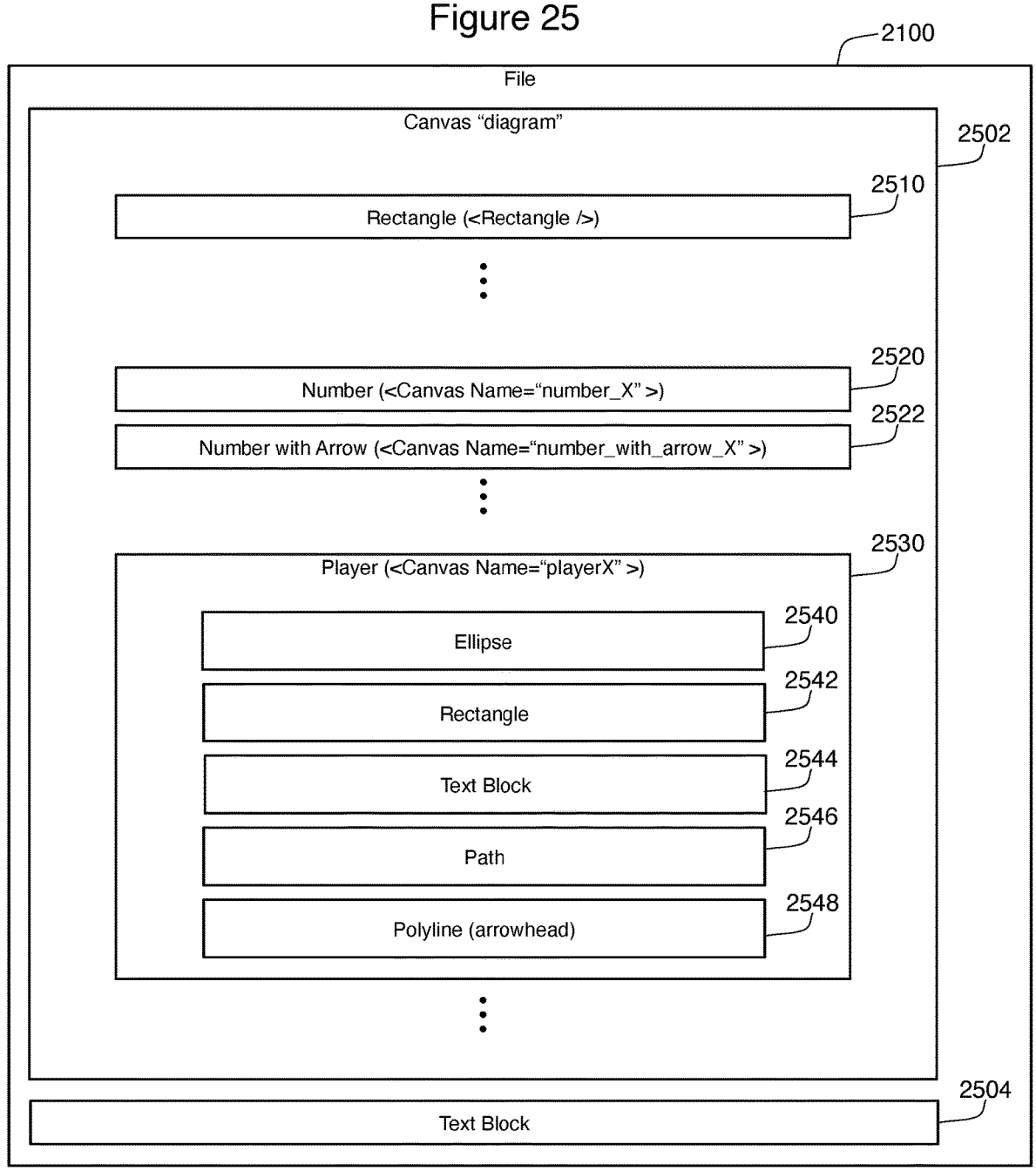
FIG. 25 is a schematic view of the configuration of the textual representation of FIG. 23.

Conceptually, the objects contained in the file 2100 are shown in FIG. 25 using the XAML object identifiers. Two outer tagged objects are included in file 2100, namely the Canvas object named "diagram" 2502 and a Text Block object 2504. The tagging that generates these two tagged objects 2502 and 2504 are actually shown in the segment 2400 shown in FIG. 24. The text block object 2504 contains the data shown in banner 2110 in FIG. 21.

The diagram canvas 2502 contains all of the other relevant graphics elements of the file 2100. This canvas 2502 contains a plurality of other objects, including rectangles 2510, numbers 2520, numbers with arrows 2522, and players 2530. The last three children 2520, 2522, 2530 are actually identified as canvas objects having a name that starts with "number", "number_with_arrow", and "player", respectively. The objects 2510-2530 can be considered the children of diagram canvas 2502, and the children 2510-2530 shown in FIG. 25 are merely examples. In file 2100, there will be many more rectangles 2510, numbers with arrows 2522, and players 2530 objects than the number shown in FIG. 25.

Player canvas 2530 shown in FIG. 25 contains its own children, namely an ellipse object 2540, a rectangle object 2542, a text block object 2544, a path object 2546, and a polyline object (that generates an arrowhead) 2548. Again, these objects 2540-2548 are merely exemplary, and a player canvas 2530 may not have all of these objects 2540-2548, and it may have duplicates of some of the objects 2540-2548. A player canvas 2530 for player 2180 shown in FIG. 21, for example, might include a total of three ellipses (2180, 2182, 2184), a text block (the number "12"), a path object 2186 that ends in an arrowhead, and a second path 2183. The presentation, size, and location of these objects will be defined within the tagged child object 2540-2548 of the Player object 2530 for that player. Of course, different player canvases 2530 will have different child objects 2540-2548 within.

Parsing Method

Figure 26:
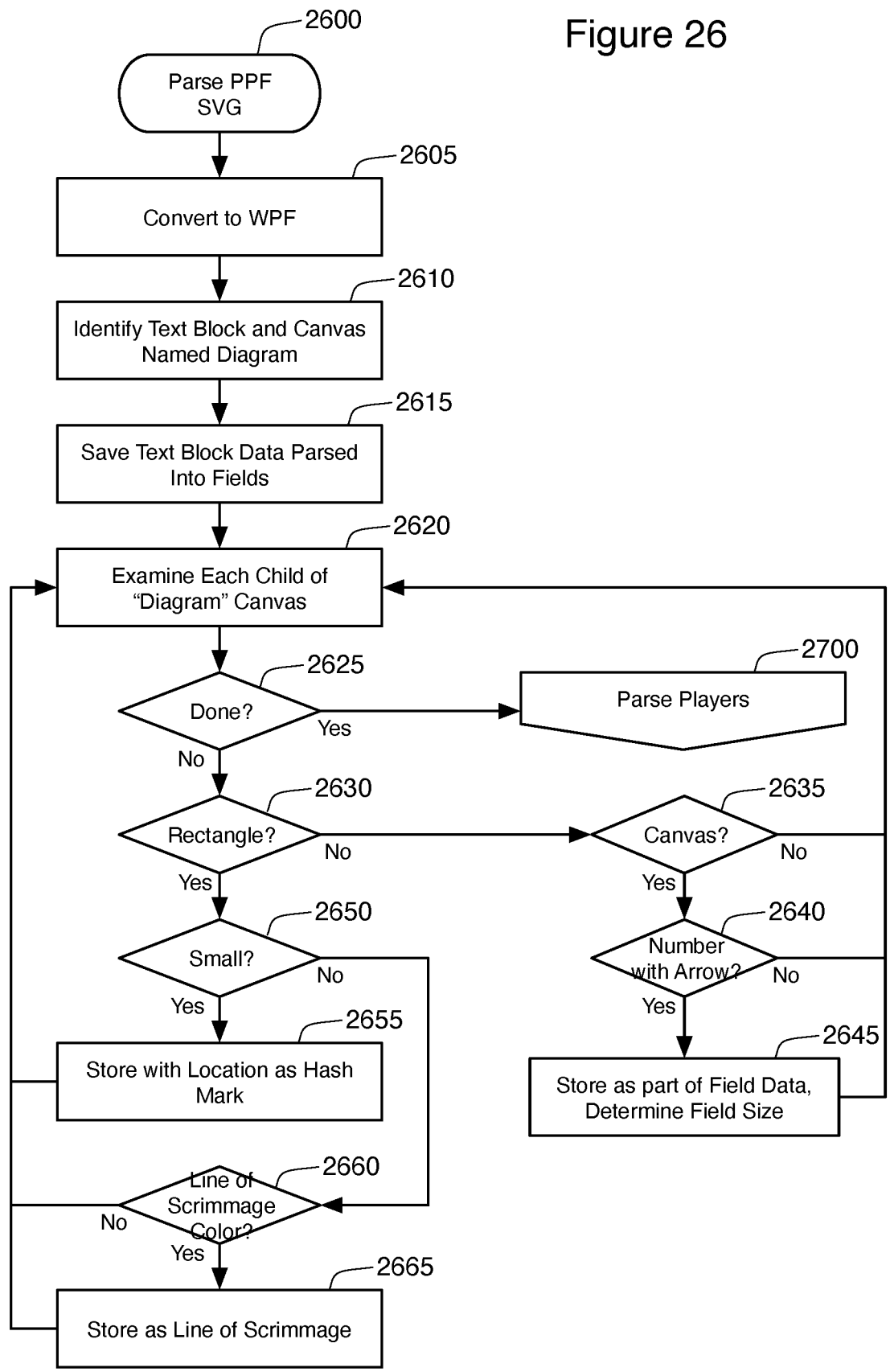
FIG. 26 is a flow chart showing a method of parsing the first format graphics file.

FIG. 26 shows the overall parsing method 2600 utilized by system 2000. The first step 2605 is for the pre-processing engine 112 to receive the file 2100 in SVG format and generate a simplified WPF file 172. This step is described above in connection with FIG. 3. Next, at step 2610, the server 110 identifies the separate text block 2504 and the canvas named "diagram" 2502 objects in the WPF file. As was the case with the descriptions above, when discussing the file to be parsed, this disclosure will refer to the original file 2100 even though this file may have been converted to a WPF file by the pre-processing engine 112. Utilizing this terminology, the server 110 identifies the text block 2504 and the diagram canvas 2502 in the received file 2100. The data in the text block 2504 is then parsed into separate data fields, such as date, play number, offensive team, defensive team, ball location, game time, etc. This data is then stored as field data in step 2615. This field data will eventually be stored in the play card 1700 that will be generated for this file 2100. This can occur in step 2615, but in the example described herein, the play card 1700 is generated at a later point so this data is temporarily stored for later recall by the server 110.

The method 2600 then turns to the diagram canvas 2502, where at step 2620 each child object 2510-2530 of the diagram canvas 2502 is examined in turn. Once all children 2510-2530 have been examined, as determined by step 2625, the method 2600 continues with the parse player method 2700 shown in FIG. 27.

With each child, step 2630 first determines if the child is a rectangle 2510. If not, step 2635 determines whether the child is a canvas type. As shown in FIG. 25, numbers 2520, numbers with arrows 2522, and players 2530 are all children that are canvases. If the child object is not a rectangle or a canvas, the child is skipped as irrelevant at this stage, and the next child is examined at step 2620. If step 2635 determines that the child is a canvas, step 2640 determines whether it is a number with arrow 2522. If not, the child is skipped at this moment. If so, the object 2522 represents one of the numbers 2140, 2142 from the input play file 2100, and therefore this object 2522 will be helpful in determining the graphical location of objects in the file 2100. More particularly, the location of the object 2522 will help define the transformation for segments that relate to the numbers 2140, 2142 in file 2100. Therefore, step 2645 will store the information from that child as part of the field data to help determine the field size. The next child will then be examined at step 2620.

If step 2630 determines that the child is a rectangle 2510, step 2650 asks whether the rectangle 2510 is a small rectangle. If it is, then the rectangle 2510 is a hash mark 2152, and step 2655 store will the location of this rectangle 2510. This is done for the same reason as storing the number with arrow information at step 2645, namely, to help define the original image background elements and segments used to perform the transformations. If step 2650 determines that the rectangle 2510 is not small, step 2660 examines the color of the rectangle 2510. The input file 2100 uses a unique color of a rectangle 2510 to mark the line of scrimmage 2120. If the color of the rectangle 2510 matches this known, unique color, then the location information for that rectangle is stored at step 2665 as the line of scrimmage location.

Parsing Players

Figure 27:
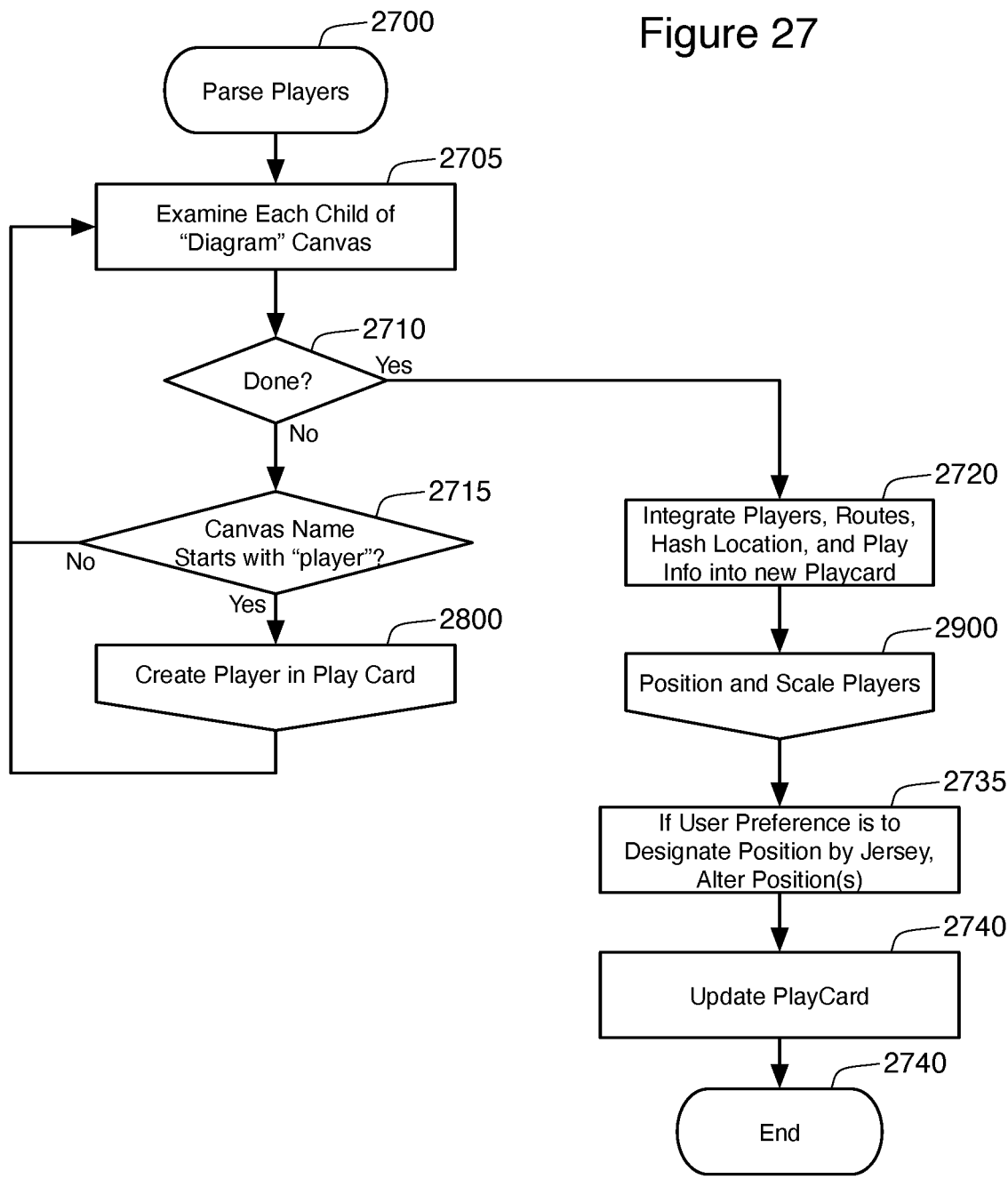
FIG. 27 is a flow chart showing a method for parsing players as part of the method of FIG. 26.

FIG. 27 shows the method 2700 used to parse player information from the input file 2100. An examination reveals that this method 2700 also calls method 2800, relating to the creation of a player in the play card, and method 2900, which is responsible for positioning and scaling the players.

Figure 28:
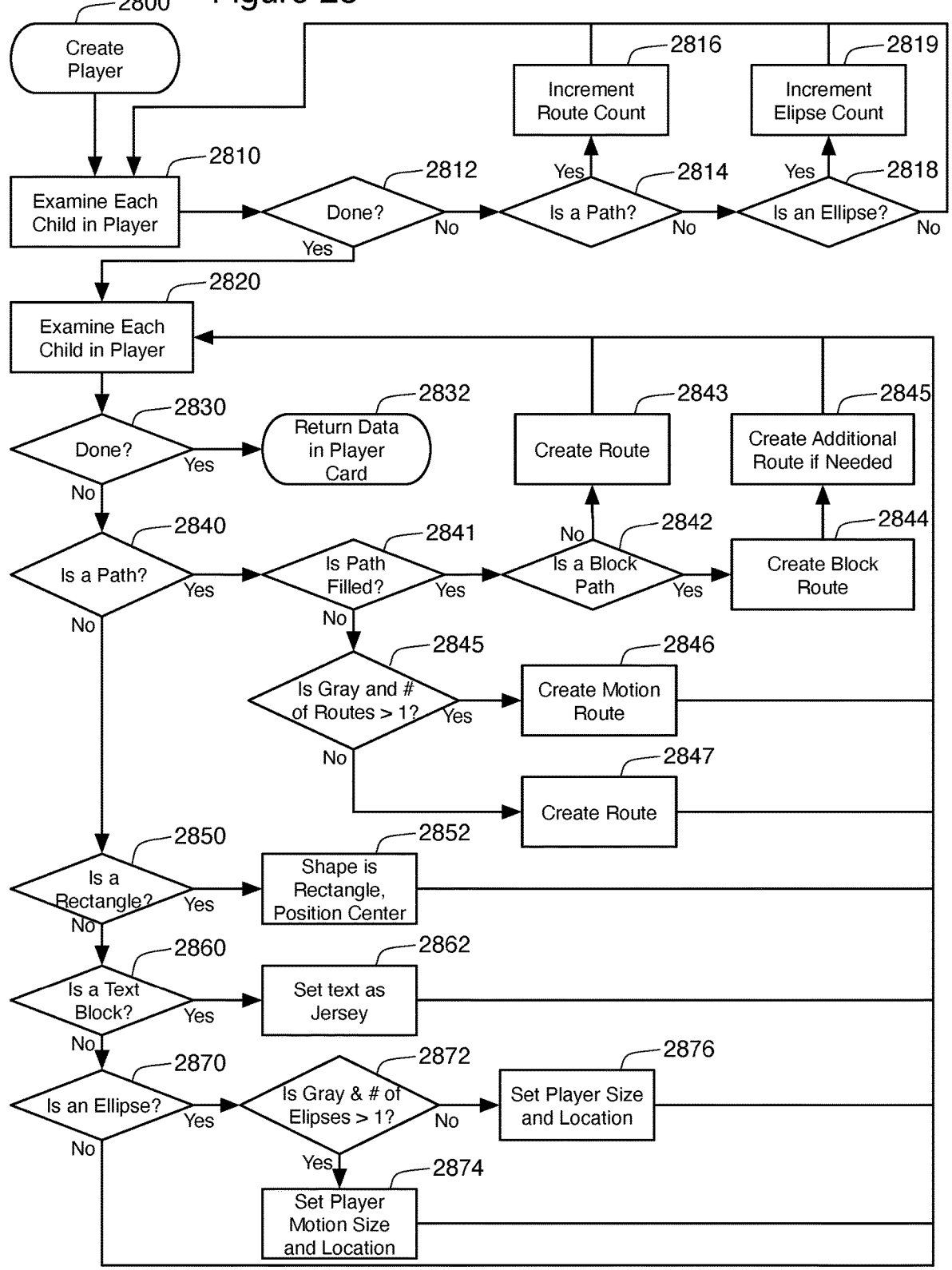
FIG. 28 is a flow chart showing a method for extracting player card data as part of the method of FIG. 27.

The method 2700 begins at step 2705 with the reexamination of each child 2510-2530 of the diagram canvas 2502, with step 2710 determining when all children 2510-2530 have been examined. The examination of the children 2510-2530 begins with step 2715, which determines whether the child is a canvas having a name starting with "player"—in other words, whether the child is a player object 2530. If not, the method 2700 selects the next child at step 2705 (method 2700 is concerned only with parsing player objects 2530). If so, the method 2800 shown in FIG. 28 is called to create the data used to populate a player 1720 for the play card 1700. In other words, steps 2705, 2710, 2715 all operate to ensure method 2800 is applied to every player object 2530 in the input file 2100.

Method 2800 is responsible for examining the content of each player canvas object 2530 selected at step 2705 by examining each child (such as children 2540-2548) in that player 2530. This actually occurs twice in method 2800—at both the first step 2810 and at step 2820. The first step 2810 selects one child for examination, and step 2812 determines when all children have been selected by this subprocess. Assuming that they have not, step 2814 determines whether the selected child object 2540-2548 is a path object 2546. If so, a route count (which starts at zero for that player canvas) is incremented, and the method returns to step 2810 to examine the next object. Steps 2814 and 2816 effectively count the number of path objects 2546 that are contained in this player 2530. Similarly, step 2818 asks whether the object is an ellipse object 2540, and, if so, step 2819 acts to count the number of ellipse objects 2540 in the player 2530.

Once the routes and ellipses are counted by steps 2816, step 2812 determines that the counting is done and the method 2800 moves to step 2820. At step 2820, each of the child objects 2540-2548 of the player 2530 are examined again, with step 2830 now being responsible for determining when all children 2540-2548 have been examined.

Step 2840 first examines whether or not the object is a path 2546. As explained above, a path 2546 is effectively a route line, and, like line 242 described above, indicates movement for the player. The path object 2546 may indicate a motion route (movement before the snap of the ball), a passing route, or a block path. Block paths, such as that shown with player number 32 (best seen in FIG. 22), can sometimes conclude with a normal passing route.

Step 2841 is the first step in determining a type for this path 2546. Step 2841 determines whether or not the path 2546 is "filled." Unfilled paths 2546 generally indicate a dashed line, such as line 2183 shown in FIG. 21. Filled paths 2546 indicate solid lines. If step 2841 indicates that it is a solid line, the method 2800 can be confident that the line is not indicating a motion route.

At this point, step 2842 analyzes the path 2546 to determine whether this is a blocking path 2546, such as the path 1410 run by player 222 shown in FIG. 14. Blocking paths 2546 appear to have a short, perpendicular line passing through the path. In the context of PFF files 2100, this perpendicular line is created by a "polyLine" type of path 2546 which defines the both the path and the blocking line termination element. The first part of the polyline goes from the player icon 222 to the blocking line. The next part then extends perpendicular to form one end of the blocking line, and the polyline then reverses direction to then form the second end of the blocking line termination element. Step 2842 analyzes the line defined by the path 2546 to determine if any portion of it exhibits this type of behavior. If it does not, the path 2546 is a normal route, and a passing route is created that is associated with this player at step 2843. If step 2842 does detect a blocking pattern to the path 2546, a blocking type route is created for the player at step 2844. After step 2844, the server 110 determines whether there are additional path segments beyond the blocking termination indicator. An example of this type of path is shown in connection with player 32 in FIG. 22, where the player moves, blocks, and then continues onto a passing route. In this case, the blocking line is not a "termination" element as it does not actually terminate the path. Step 2845 analyzes the additional path segments, and if an additional route is indicated after the blocking line, a passing route is also created for the player 2530 at this step 2845 beginning at the point of the block.

If step 2841 indicates that the path 2546 is not filled, then this could be a motion route. However, encoding errors have sometimes meant that normal routes are encoded with dashed or unfilled paths. Thus step 2845 determines whether the color of the path is gray (the color typically assigned to motion paths in file 2100) and whether the total route count from step 2816 is greater than 1. Testing the route count is a third way to verify that this is a motion route paths 2546, as motion routes typically accompany a second after-snap route path 2546. If step 2845 verifies that this is a motion route, then step 2846 establishes a motion route for this path 2546. If step 2845 cannot verify this, then the path 2546 will be used to create a normal route at step 2847.

If step 2840 indicated that the child is not a path 2546, then step 2850 determines whether the child is a rectangle object 2542. This kind of object identifies the shape of the icon used for the player. The rectangle shape is used only for the center position (with a square being a type of rectangle). Thus, if step 2850 indicates it is a rectangle 2542, step 2852 sets the position for the player 2530 as a center. In addition, as the center position, the location of this rectangle 2542 will be used to determine the base position of the offensive line. In some embodiments, whether the center position is located on the right hash, middle hash, or left hash, will also be identified. After step 2852, the next child is examined at step 2820.

If the child is not a rectangle, step 2860 determines if it is a text block 2544. If so, then this is the jersey number for the player 2530, so step 2862 sets this value based on the content of the text block 2544.

If it is not a text block, the child is examined at step 2870 to determine if it is an ellipse 2540. If not, the child will simply be ignored and the next child will be examined. If it is an ellipse, the method 2800 needs to determine if the ellipse (which will generally form a circle) represents a motion position or a standard AtSnap position. Step 2872 determines if the ellipse is gray (the color for motion position ellipses) and if the number of ellipses counted at step 2819 is greater than one. Again, the use of color only has proven insufficient to firmly establish the ellipse as the motion position. If, however, the ellipse 2540 is gray, and more than one has been counted, the step 2874 stores the location and size of this ellipse 2540 in association with the player 2530 as a PreSnap location. Step 2876 does the same thing if the ellipse 2540 is not a motion ellipse, but this is then simply established as the location and size of the AtSnap position of the player.

Once all the child objects 2540-5248 for the player 2530 have been analyzed, as determined by step 2830, step 2832 will return the data for the play card 1700 for this player 2530. In particular, the data for the player 1720 and their route(s) 1730 will be created, including individual route sections 1740 as appropriate. This data is returned to method 2700, which then analyzes the next child of the diagram canvas 2502 at step 2705.

If step 2710 determines that all children of the diagram canvas 2502 have been examined, step 2720 will generate and populate the PlayCard 1710, including the Player 1720, Route 1730, and Route Sections 1740 information. Receiver split 1750 information will be determined by method 2900, which is performed next after step 2720 completes the initial population of the PlayCard 1710.

Position Adjustments and Scaling of Players

Figure 29:
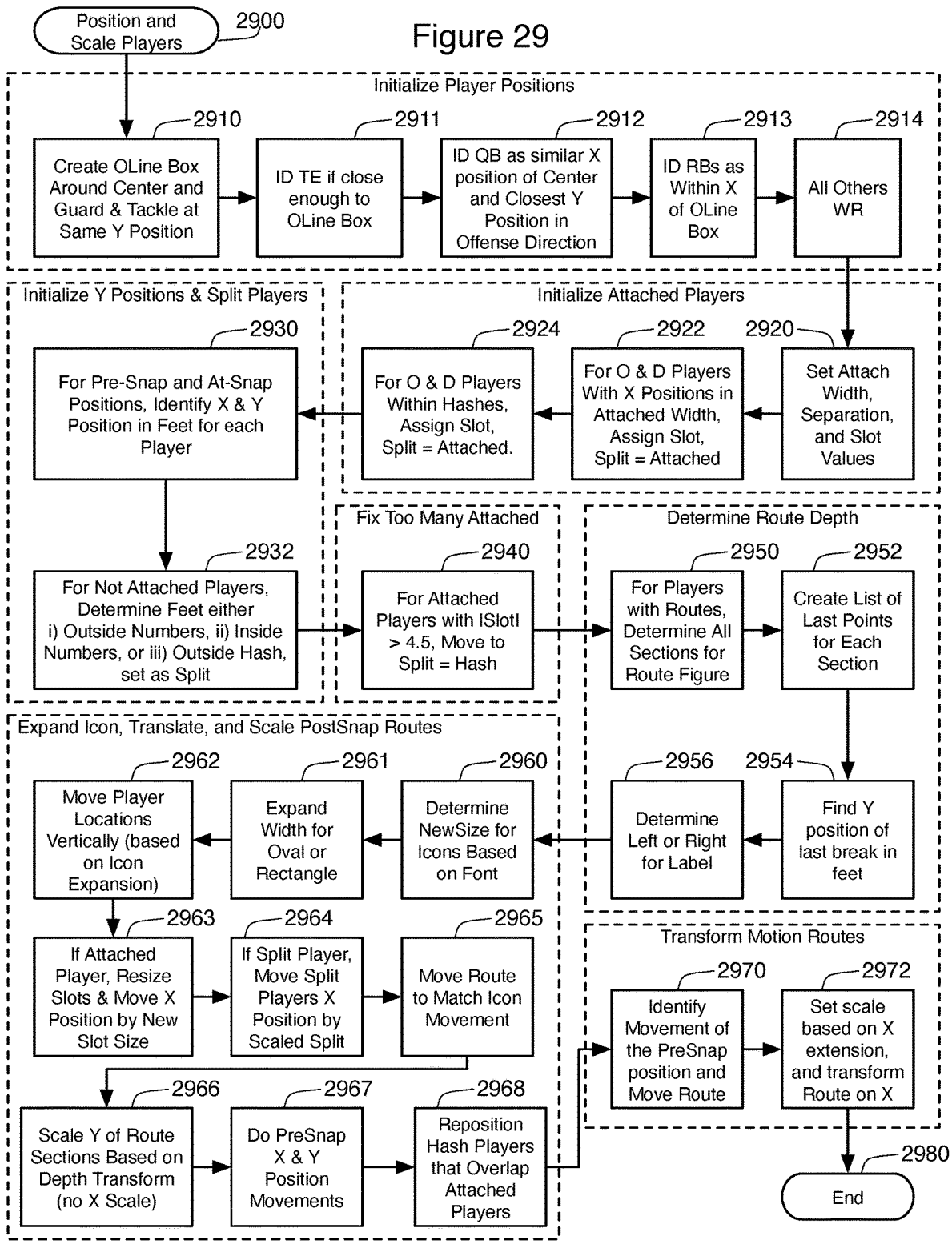
FIG. 29 is a flow chart showing a method for positioning and scaling players as part of the method of FIG. 27.

FIG. 29 show the method 2900 used for adjusting the position and scale of the individual players 2530. It is here that the multi-segment transformation occurs to prepare the elements of the PlayCard 1710 to be presented on the new background image 2200. The method begins with step 2910, where a box is first generated to define the offensive line. This box, called the OLine box, is created with reference to the positions of the players 2530 in file 2100. Technically, the already extracted data in the player data objects 1720 in the PlayCard 1710 is used for this analysis. The OLine box 3002 is shown as a dotted box 3002 in FIG. 30, where an example configuration of some offensive players is presented below the line of scrimmage 2120. This box 3002 could be an actual graphical box defined according to the XAML or SVG file being analyzed, but it can just as easily be dimensional values stored within the server 110 that defines an area in an X, Y coordinate system. The OLine box 3002 is first drawn around the square indicating the center position 3020, which was identified in step 2852.

The guard positions 3022, 3024 will be the two players 2530 at the same Y position as the center 3020 that are nearest the center 3020 on either side. When these two positions 3022, 3024 are identified, their player cards 1720 are updated with position information (these players objects 1720 will have a position set to that of Guard, or Left Guard and Right Guard, respectively). The OLine box 3002 is then redrawn around their circular (ellipse) icons 3022, 3024 of the guards. The tackles 3026, 3028 are next identified, being at the same Y position and on either side of the identified guards 3022, 3024. When identified, their player cards 1720 are updated with position information, and the OLine box 3002 is again expanded around their icons.

At step 2911, the method 2900 examines the next nearest players to the OLine box 3002 at the same Y position as the center 3020 and outside the tackles 3026, 3028, in order to determine whether there are tight ends in this offensive formation. Tight ends are distinguished from wide receivers, which may also be at the same Y position and outside the tackles 3026, 3028, based on whether or not their player object 2530 places them near enough to the OLine box 3002. To determine whether or not the next closes player is near enough, and therefore a tight end, step 2911 examines the width 3040 of the center square icon 3020 (considered the standard width of each offensive lineman) and the total width of the OLine box 3002. The OLine box 3002 will contain five players 3020-3028, so these players together take up five times the width 3040 of the center 3020. The width of the OLine box 3002 minus five times the width 3040 of the center 3020 will leave the spacing distance between all of the line players. Dividing this number by four (the number of gaps between players 3020-3028) establishes the OLine Separation distance 3042. If a player, such as player 3030 is found on either side of the OLine box 3002 within the space of the OLine Separation 3042 plus the width 3040 of the Center square 3020 (which is distance 3044, which will be less than 1.5 times the width 3040 in embodiments where the OLine Separation distance 3042 is less than have the width of the center square icon 3030), the player 3030 is considered close enough to form part of the offensive line. The OLine box is extended around this player 3030, and the player 3030 is identified as a tight end.

At step 2912, the quarterback 3032 is identified as a player that both has a similar X position to the X position 3070 of the center 3020 and is closest (by Y position—on the offensive side) to the center 3020. At step 2913, any running backs, such as player 3034, are identified by identifying additional players on the offensive side that have an X position 3076 within the width of the OLine box 3002 that are not the quarterback 3032 and are not in the Oline box 3002. Step 2914 identifies all remaining offensive players as wide receivers (not shown in FIG. 30). The assigned position information will be stored in the respective player cards 1720.

Figure 30:
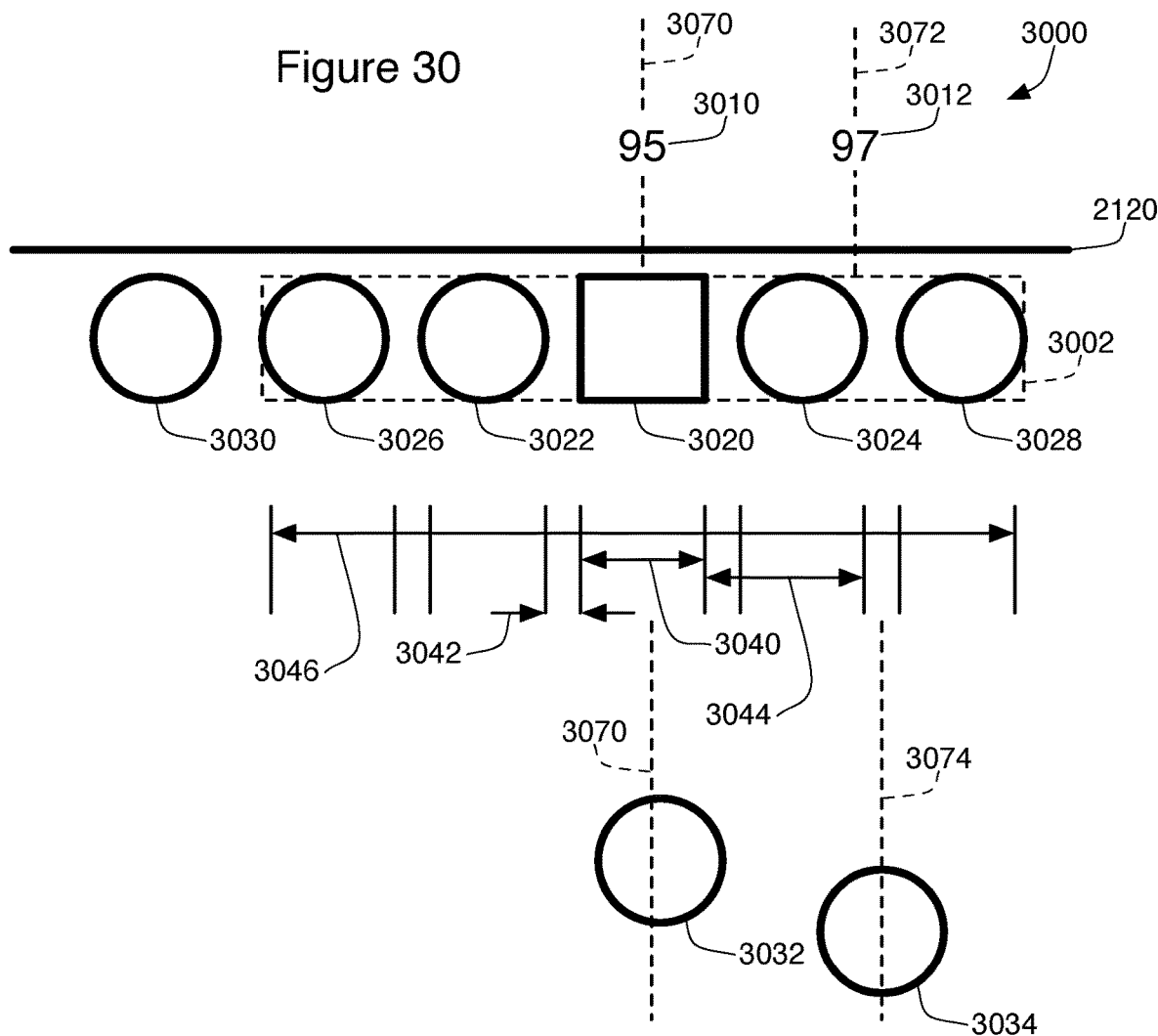
FIG. 30 is a schematic representation of a portion of a file in the first format graphics file showing extracted data.

Steps 2910-2914 are responsible for initializing player positions; thus, they are shown in FIG. 29 inside a dashed box that is so labeled. The various steps shown in FIG. 29 can be grouped inside of various dashed boxes, which indicate the high-level functions being performed by individual steps. The next high-level function is to identify and initialize "attached" players objects, which begins with step 2920. This step 2920 identifies the "slot-value" and the X value of the left and right side of the center 3020. The slot-value is calculated as the width 3040 of the center 3020 plus the Oline Separation 3042, and therefore is equal to value 3044. An attachment width 3046 is then defined then extends from the left position of the Center 3020 minus 2*Slot-value 3044 to the right position of the Center 3020 plus 2*Slot-value 3044. The attachment width 3046 is also shown in FIG. 30.

Step 2922 then identifies all players that have an X coordinate for their AtSnap or PreSnap positions within the attachment width 3046 and then assigns a "slot" value for those positions based on the relative X position as compared to the center. All AtSnap or PreSnap positions that have approximately the same X parameter 3040 as the center will be assigned a slot value of 0. Thus, defensive player 3010, which is exactly at the center position 3070, will have a slot value of 0, as will the quarterback 3032. For other players, the Center player's X position 3070 is subtracted from that player's X position, which is then divided by the Slot-value 3044 to determine the slot position. Using this determination, a slot value of exactly −1 should approximately coincide with the middle of the left guard 3022, a slot value of −2 would be the left tackle 3026, +1 would correspond with the right guard 3024, and +2 with the right tackle 3028. The slot value for defensive player 3012 (based on X position 3072) will be approximate +1.3, while the slot value for offensive player 3034 (based on X position 3074) will be approximately +1.5. A negative slot value will indicate that the player is lined up to the left of the center 3020.

A separate value, known as the "split" value, is also assigned to various player positions. All positions assigned a slot value will be given a split value of "attached," which indicates that these positions are attached to the respective offensive line positions.

The assigning of slot values allows players displayed on the original file 2100 to be moved as part of the segment transformations, while still allowing the player to be properly aligned with other players. This is especially relevant in the context of transformation 2250. Referring back to FIG. 22, this transformation 2250 enlarges the size of the font and the player icon used for the players. When this enlargement 2250 occurs, it is likely that player icons will overlap, especially on the offensive and defensive lines. One embodiment of the present invention therefore will spread out these icons to avoid any overlap. Thus, the application of the enlargement transformation 2250 and the additional spreading that occurs means that an individual player icon may move with respect to their location on the field even after the 2220, 2230, and 2240 transformations are applied. While this is acceptable, it is important that the relative X parameter for player positions with respect to each other be maintained. These slot value make this possible.

In some embodiments, all player positions with an X parameter within the hashes 2150, 2152 (as determined by step 2655) is considered "attached" even if they are not within the attachment width 3046, as is shown at step 2924. In these embodiments, it is still possible that all player positions within attachment width 3046 will also be considered attached. All attached players are assigned a slot relative to the center 3020. Referring back to FIG. 22, these players will be considered to fall within original segment 2242.

Players 2530 may have both an AtSnap and a PreSnap position, which were identified and distinguished at steps 2874 and 2876. Each position is separately considered, and if they are within the attachment width 3046 (or within the hashes 2150, 2152, depending on the embodiment), that position will be assigned a slot value and be assigned a split value of "attached."

Note that the football play input file 2100 shown in FIGS. 21 and 22 is only an example of the type of file that can be transformed using the methods described herein. Other, non-football play, input files 2100 can also define a subset of the objects found therein as "attached" and then treat these objects separately from other, non-attached objects. The new positions of non-attached objects can generally be determined directly using a transformation, such as transformations 2220, 2230, 2240, and 2260. Attached objects, as explained below, are treated differently, in part due to the congestion that might require minor movements when objects are enlarged (transformation 2250) or transformations 2220, 2230, 2240, and 2260 move objects into a smaller target size. As explained in more detail below, attached objects are located with relative to a new position for a base object (such as the center 3020), with a slot value being indicative of the new relative position. Thus, while the "slot" value has particular meaning in the football context, the term slot can be applied in other contexts to indicate relative position of an attached object when compared to the base object.

Next, method 2900 identifies the original locations of identified objects on the input file with respect to the original background image. In the context of input file 2100, the objects include players and routes, and the original background image includes sidelines 2130, 2132, numbers 2140, 2142, hash marks 2150, 2152, and individual yard markers and the line of scrimmage 2120. In particular, method 2900 converts the location of player positions from points or pixels (used by file 2100) to feet (or yards or meters or centimeters or any other real-world value) with respect to elements in the background image at step 2930. The conversion is straight-forward, as the input file will be established with a scale value, such as Z points per feet. The X and Y locations are converted from points to feet using that scale. Alternatively, the scale can be determined by identifying a distance represented in the background of the image 2100 (such as the distance from sideline 2130 to sideline 2132) and comparing that to the known, real-world value. In one embodiment, X position in feet is relatively to one edge of the image 2100 (such as left sideline 2130), and the Y position in feet is determined relative to the line of scrimmage 2120. Because the original Y position of the players 2052 was recorded in points (or pixels) from a top or bottom edge of the image 2100, a simple conversion is applied based upon the determining the relative location of the player 2052 from line of scrimmage 2120.

Next, step 2932 determines a split value for non-attached player positions (positions that did not have a split value of "attached" assigned in step 2922 and 2924). Split values are measured in yards based on an appropriate split mark. There are three different types of split values: yards outside the numbers 2140, 2142; yards inside the numbers 2140, 2142; and yards outside the hash 2150, 2152. These three types repeat on both sides of the field, technically creating six different split value types. Referring back to FIG. 22, splits that are outside the numbers 2140 would be in original segment 2222, while splits that are measured in yards inside the numbers 2140 or outside the hash 2150 would be in segment 2232. Step 2932 identifies the appropriate type of split depending on the X location of the player position, with the choice between yards inside the numbers 2140, 2142 and yards outside the hash 2150, 2152 being made depending on whether the position is closer to the numbers 2140, 2142, or closer to the hash marks 2150, 2152. Once determined, the yardage value and type of split is stored in the receiver split object 1750 that is associated with the player object 1720 in the PlayCard class structure 1700.

Step 2940 is designed to fix situations where too many players 2052 are assigned as attached, which may occur, for instance, in goal line situations. Any player with an absolute value of a slot position greater than 4.5 will be converted to a split value for the appropriate hash. If the slot value is negative, the split value will be the left hash, and if the slot value is positive, the split value will be the right hash.

Steps 2950 to 2956 next determine the route depth, which was described as the depth of point 2188 in FIG. 21. This can be a tricky process, as the path objects 2546 that comprise the route (such as route 2186) can be composed of many different segments. In the PlayCard structure 1700, all of the route sections are stored in object 1740, which is associated with the route object 1730. A player may, for instance, go out on a route, turn and head back toward the line of scrimmage, and then turn again and head away from the line of scrimmage. In this context, the "depth" of the route is the Y position of the first turn back toward the line of scrimmage, not the last turn. To analyze this, step 2950 first accumulates a list of last points for each line section that comprises the route. The term line section in this context is used loosely, as the segment may in fact be an arc, a Bezier curve, a straight-line, or quadratic Bezier segment. In addition, some segments comprise conglomerations of other segments, such as a poly line, a poly quadratic, or a poly Bezier. Poly elements will be broken into their individual segments. And in each case, the X and Y value of the last point of each segment is added to a list in step 2952.

The points in the list are then traversed in step 2954. For each point, this step 2954 asks whether there is another point after that point that has a different X position. If an X position does not change, the player is moving straight down the field after this position. Such a movement change does not constitute a depth point, and thus that point cannot be the depth point. Routes that start at the AtSnap position and only move straight down the field do not have a route depth. If there is no next point, then this is the last point, and it also cannot identify the location of the depth point. If the X position of the next point does change, then the point is added to a list of potential depth points, and the next point gathered by step 2952 is considered. When all points have been considered, the last point on the list of potential depth points is considered the depth point. The difference between Y position of this depth point and the line of scrimmage 2120 is determined and then converted to yards. This is the route depth value in yards. The route depth and depth point are then stored.

In the preferred embodiment, the route depth is written as a number near the depth point when the route is displayed in the final presentation. Depending on whether the route turns to the left or right at the depth point determines whether the displayed route depth should be displayed to the right or left of the depth point to avoid overlapping the route. Step 2956 determines which side should be used for the route depth label. This accomplished by examining the last point on the list created at step 2952 and determining whether its X position is to the left or right of the depth point. The label is be presented on the opposite side. The side for the label, the route depth itself, and the depth point are stored in the receiver split object 1750.

Steps 2960-2968 perform the transformations 2220-2250 on the player positions, icons (rectangles and ellipses), and AtSnap routes, and then handles crowding issues caused by the enlargement transformation 2250. The first step 2960 is to determine the size of the text that will appear in the player icon (which is usually the player's jersey number or a position indication). This is calculated based on the content of text, the font, and font size. The font and font size are determined through user preferences but will almost always result in larger type than that found in the original file 2100. The height and width of this text is calculated, the maximum of the height and width are selected, and the size of icon needed for this size is determined. This will be the new size for the icons and can be considered the NewSize value. Although the above examples always show the ellipses 2540 as circles and the rectangles 2542 as squares, this is not a requirement. Preferences can allow these icons to be stretched horizontally into ovals and rectangles. If so, a width modifier of 1.4 is selected and applied to the NewSize value to determine the NewWidth for the icons (otherwise the width modifier is 1.0 and the NewWidth is the same as the NewSize). This is performed at step 2961. The calculated size change is then stored with each position.

At step 2962, the vertical position of each location is adjusted by half of the increase to the Y dimensional size of the icons. In step 2962, If the icons appear bigger by 10 points, their position will be adjusted by 5 points. Defensive players have their vertical position adjusted upwards (a negative Y position) while offensive players have their vertical positions adjusted downwards (a positive Y position).

Steps 2963 and 2964 both adjust the X parameter of the player positions in order to generate new locations for the players/objects. Step 2963 applies only to player positions that have a slot value (an attached player in original segment 2242). Since the icons have expanded by the NewWidth value, slot players are likely to be crowded together and perhaps even overlapping. Step 2963 determines a new X parameter for the player position based on the X parameter for the center 3020. A new slot value will need to be created based on this NewWidth value. As explained above, the SlotValue 3044 was equal to the width 3040 of the center 3020 plus the Oline Separation 3042. The new slot value is now the NewWidth plus the previous OLine Separation value 3042. The new X position of all attached players is now their slot number (−4.5 to +4.5) times the new slot value, plus the current position of the center 3020. Half of the width of the new center can also be added to determine this X position.

The repositioning of the center 3020 onto the preferred background image 2200 can be accomplished in a variety of manners. In one, the location of the center 3020 in the original file 2100 is established as a percentage of the distance between the left hash 2150 and the right hash 2152. Transformation 2240 indicates how this distance has changed in the preferred background image 2200, and the same percentage can then be used against the increased distance in the preferred background image 2200 to locate the center 3020 within target segment 2244. Alternatively, as noted above, an approximate location of the center 3020 between the hashes (left hash, middle hash, right hash; or any other such approximation) was identified when the center 3020 was first identified in step 2852, and this location can be used to locate the appropriate position of the center 3020 on the preferred background image 2200.

Step 2964 adjusts the X position for players that do not have a slot value, but instead of a split value of something other than "attached." The new X position will be based on the split, such as 3 yards outside the numbers, 1 year inside the numbers, or 2 yards outside the hash. The X transformation required to render these positions on the desired background image 2200 is either the 2220 transformation (for the area between the numbers and the sidelines) or the 2230 transformation (for the area between the numbers and the hash marks). These transformations are linear in nature, and so can be used to reset the positions of the unattached players based on the scale of pixels/points per yard in the appropriate segment 2224, 2234 (or the equivalent right-sided segments) of the preferred background image 2200.

These transformations are then used to position the unattached players. In one embodiment, for players positioned between the numbers and the sideline, the relative position of the players between these two elements will be identified. For instance, the player may be 75% of the way from the sideline 2130 and the numbers 2140. The transformed X position will be the X position that is 75% of the way from the sideline to the numbers in the background image 2200. The same transformation can be used to position players originally found between the numbers 2140 and the hashes 2150, or on the right side of the field.

In a second embodiment, the number of yards between the elements, such as the sideline 2130 and the numbers 2140 is known (i.e., 12 yards on a professional field). A split position of +4 yards from the numbers 2140 will indicate that the player is 66.7% of the way from the sidelines 2130 to the numbers 2140. This value can then be used to position the X position of the same player on the background image 2200, effectively performing transformation 2220. Regardless of which technique is performed, step 2964 moves the player positions via their split position on only the X axis according to the transformation defined for their segment.

When players 2530 have moved and they have associated routes 1730, their routes 1730 should also change as the route origins are frequently defined by X and Y positions as opposed to simply connecting to a player icon. To accomplish this, step 2965 will translate (move) the route on the X axis the same amount that the player position (more particular, a calculated center position for the player) has moved. This ensures that the base of the route 1730 will match with the player icon.

Step 2966 the scales the route along the Y dimension. As shown in FIG. 22, the selected background image 2250 can have a Y dimension transformation 2260 that differs from all of the X dimension transforms 2220, 2230, 2240. If the Y dimension is extended by this transform 2260, the Y dimension of the play should also extend by the same amount so that transition and depth points end up on the proper position on the field. The amount of expansion (or contraction) of the route along the Y dimension will be identical to the height difference ratio indicated by transform 2250.

Method 2900 only includes steps for scaling the route sections along the Y dimension and not the player positions. Nonetheless, it would also be possible to scale the position of the player positions on the Y axes using the same transformation 2250 values. The line of scrimmage 2120 would be the static origin of the transformation, with player positions off of the line of scrimmaged being scaled along the Y dimension appropriately. In some embodiments, this is not necessary and can cause additional work, as a Y dimension translation of the player position will require a Y dimensional translation of any routes in order to stay attached to the player icon.

In one embodiment, steps 2963 to 2966 are performed only on the AtSnap positions and routes (passing and blocking). In these embodiments, step 2967 will then be responsible for altering the X and Y coordinates of the PreSnap positions (such as positions 2182 and 2184 shown in FIG. 21). In this case, step 2967 will perform the same process described in connection with steps 2963, 2964, and 2966 on PreSnap positions. The route transformation of step 2965 would not be applied at this point to the motion routes.

In some cases, the expansion of the attached players 2530 using transform 2250 at steps 2960 and 2961, and the redistribution of the slots at step 2963, will cause the player positions to move outward to the point that they overlap unattached player positions aligned inside (or even outside) the hash marks. Step 2968 determines whether the right-most attached player position overlaps or contacts the left-most player position that utilizes a split based on the right hash. If so, the amount of overlap is determined, and the player on the right hash is moved by the amount of the overlap to the right. The same occurs on the left side (for the left-most attached player). This action is done for all AtSnap and PreSnap positions.

The previous steps have not moved and scaled the motion routes. Motion routes start at a PreSnap position and can terminate at another PreSnap position (which is then followed by another motion route, as shown in the enlarged version of FIG. 21) or at an AtSnap position. Frequently, these motion routes travel mostly horizontally along the X coordinates, and therefore will require an X coordinate scale transformation (stretching or contracting). Note that this motion route may pass between two transformation segments (from the left segment between the numbers 2140 and the hash 2150, for example, to the right segment between the hash 2152 and the numbers 2142). The moving and scaling of the motion routes occurs begins at step 2970, which identifies any movement that occurred in the previous steps to the PreSnap (origin) icon position. This step 2970 then translates the entire motion route that originated at the PreSnap location to compensate for this movement. Note that the PreSnap position would not normally be translated along the Y axis relative to any other player positions on the same offensive or defensive side, so this translation will be along the X dimension.

Next, step 2972 determines the previous X distance between the original beginning and ending point of the motion route, and then divides this by the X distance between that same ending point and the new PreSnap icon position. This determines a scale factor that indicates by how much the motion route should expand or contract. The motion route can then be scaled by this factor. Note that the motion route may not be a straight line, and can include elements such as Bezier curves, so the scaling of the motion route will extend or compress the route without altering the overall shape of the route.

This concludes method 2900, which ends at 2980. Note that the implementation of the steps of method 2900 can be implemented such that all the steps 2910-2980 are applied to one player 2530, and then they are applied to the next player 2530, until all players 2530 are processed. Alternatively, each of the dashed box sets of instructions can be applied on all players before the next dashed set is applied. The variations on how the steps are applied to multiple players 2530 are numerous, but each case the steps of the method 2900 are applied to all of the players.

At the end 2980, there are numerous transform values that have been determined for the player positions/icons, and the routes. These transform values can be stored separately from their original positions and shapes in the PlayCard class structure 1700. Alternatively, the transformed values can take the place of the original values either during the execution of method 2900 or at end 2980. Either way, the transform values should then be used to create drawings based upon the data in the PlayCard 1710.

The end of method 2900 returns the processing of the system 110 to FIG. 27 and step 2735. Here, user preferences are checked to determine if player position should be established based on the jersey number associated with the player data as opposed to the player positions established at steps 2910 through 2914. If so, the user may manually enter jersey numbers and assigned player values. Alternatively, team lists having jersey numbers and player positions can be input or imported, and the position values can be extracted from that list. Step 2740 ensures that all data and changes made in any of the previous steps is stored in the PlayCard structure 1700. The parse player method 2700, and hence parse PPF file method 2600, then ends at step 2740.

Drawing Creation

Figure 31:
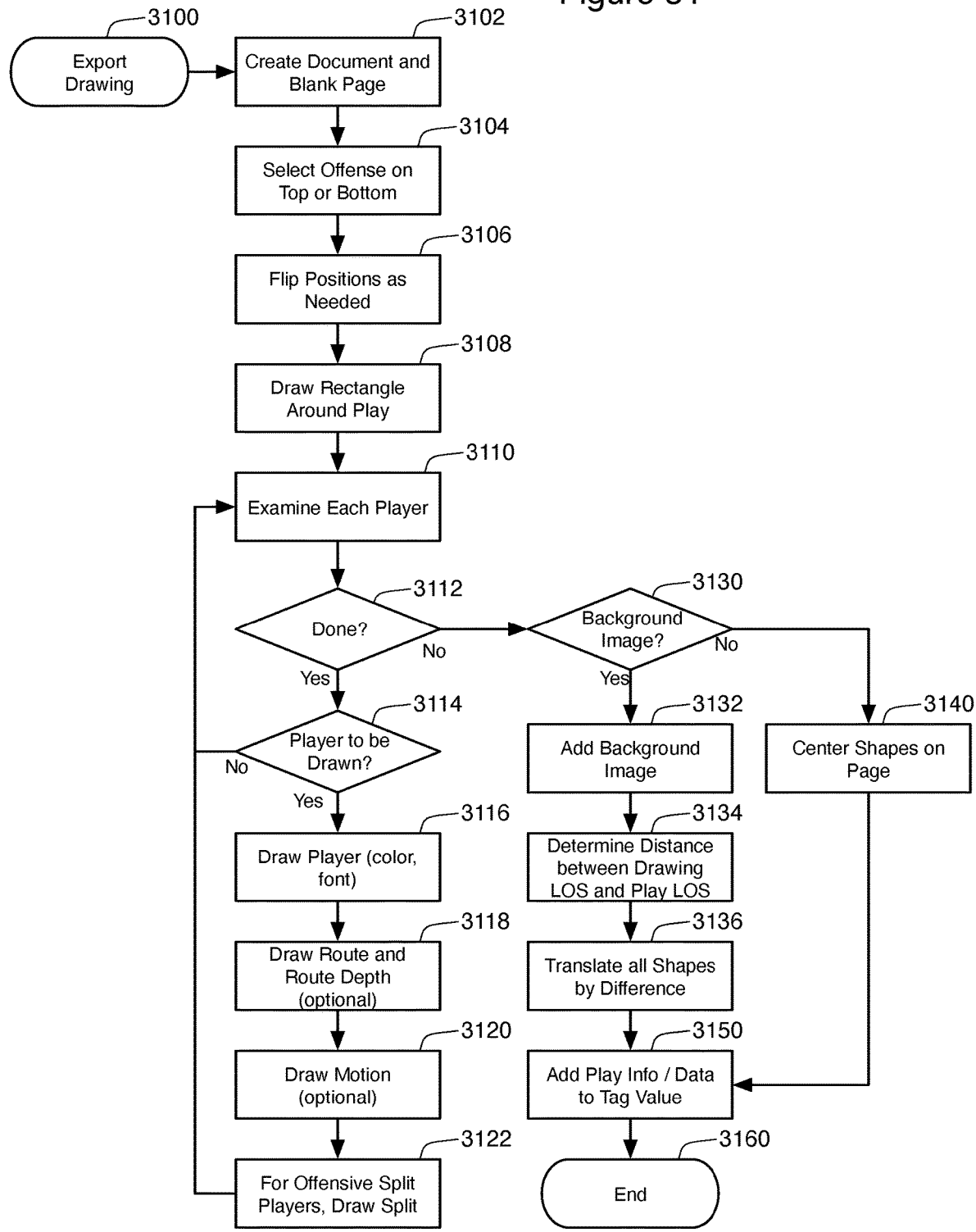
FIG. 31 is a flow chart showing a method for exporting a drawing file as part of the method of FIG. 27.

FIG. 31 shows a method 3100 for creating or exporting a two-dimensional drawing from a populated PlayCard 1710 created through the methods described in connection with FIGS. 20-30. In particular, this method 3100 can be used to create a document, or page in a document, in Visio or PowerPoint (generically referred to in the following description as the graphics program or program) that combines the new background image 2200 with renderings of the identified and transformed objects.

The method 3100 begins with step 3102, which creates a new document in the graphics program. At step 3104, a user option to place the offense on the top of the drawing or the bottom of the drawing is selected. This option can be selected regardless of whether the original file 2100 placed the offense on the bottom (as shown in FIG. 1) or the top. Step 3106 examines the preference selected at step 3104, and if necessary, transforms the positions the player icons and the routes to reverse the presentation. To flip a drawing vertically, all Y coordinates are multiplied by −1, and then offset by adding to that value the height of the file. Thus, if the original file was 1000 points in the Y position, and one item was at Y position 200 and another at 600, these values would be multiplied by −1 and then the height of 1000 points would be added, created new values for these items at 800 and 400. To flip a drawing horizontally, all X coordinates are multiplied by −1 and then offset by adding to that value the width of the file. Flipping in only a single coordinate creates a mirror flip, while flipping both X and Y can accurately reflect flipping the offensive and defensive sides while maintain right/left differences. In some embodiments, transforming the file to have offense on top requires a flip in one dimension (horizontally or vertically), and transforming the file to have the offense on the bottom requires a flip in the other dimension (vertically or horizontally).

At step 3108, a rectangle is drawn to create a border for the play being drawn. This ensures that a graphics program that automatically zoom images to fill an area will zoom each play to the same amount regardless of the spread of the players in the play, as the rectangle will have a preset size defining the exterior dimensions of the play.

Step 3110 then examines each player 1720 for a PlayCard 1710. Step 3112 determines when all of the players have been reviewed. The first step 3114 undertaken for a player is to determine whether or not the player 1720 is to be drawn. This can be determined by preferences set by the user. In some instances, the user will not want defensive players to be drawn. This can be set by a preference, and method 3100 will then skip all defensive players. If the player is not to be drawn, the method returns to step 3110 to select the next player 1720.

If the player is to be drawn, the player class 1720 provides sufficient information to draw the player, including the color, font, and font size. In some instances, the preferences allow the user to select these values. These values can be tied to other data associated with the player. Certain player positions, for instance, can have a fill of a certain color. Other positions can be given different shapes.

Step 3118 determines if any routes 1730 are associated with the player 1720. If routes 1730 are found, and the preferences indicate the user wants routes to be drawn, step 3118 will draw the routes 1730. As explained above, routes can be classified as blocking routes, passing routes (sometimes referred to as simply routes), and motion routes. Step 3118 will draw blocking and passing routes, and step 3120 is responsible for motion routes 3120. Preferences can provide for the drawing of blocking and passing routes but not motion routes, and vice versa. To draw the routes 1730, each route section 1740 that makes up the route 1730 will be drawn. The final step for drawing a player 1720 is to draw the receiver split and route depth information on the drawing based on the data in element 1750. This is textual information (which includes numbers), and therefore is placed on the drawing as text. The split value (e.g., +2) is drawn near the AtSnap icon. The context, such as (+2) "from the right hash," should be clear from where the player icon is found. Alternatively, this context can be included in full or abbreviated form next to the text for the split value. The route depth value will be drawn near the depth point.

Once all players 1720 are handled, step 3130 determines whether the background image 2200 desired by the user should actually be include with this drawing. If it is, step 3132 draws the background image 2200. At step 3134, the server 110 will identify any distinction between where the line of scrimmage was assumed to be for the players when drawn, and the line of scrimmage in the drawing. If any difference was noted, all shapes and routes and text values will be translated by that difference to make sure of the alignment between the background 2200 and the players 1720 at step 3136. Note that the transformations 2220, 2230, 2240, 2250, 2260 shown FIG. 22 are already reflected in the location and size values of the players 1720, routes 1730, and route sections 1740, so the player locations should now match the background 2200 appropriately.

If the user did not want to include the background image, the drawn players will simply be centered within the rectangle at step 3140. After either step 3140 or 3136, step 3150 will add play information and data from the PlayCard 1710 to the image. This would include information identified in text block 2504 as shown in FIG. 2100 at 2110. The method 3100 to draw this play then ends at step 3160.

Figure 32:
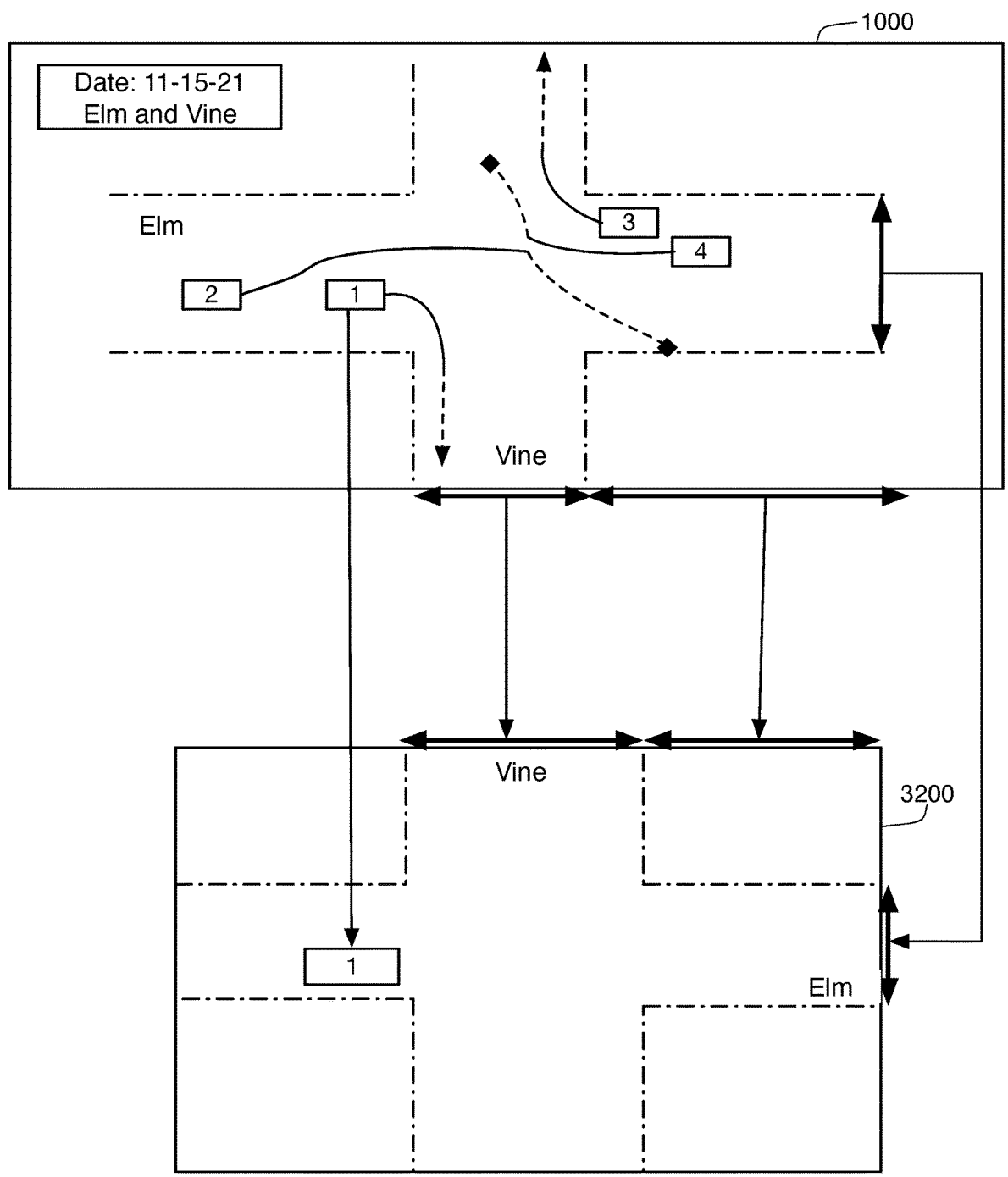
FIG. 32 is a schematic view of a transformation involving the fourth embodiment of an input file of FIG. 10.

FIGS. 20-30 described a process for extracting items from a background in an input image, and then using multiple segment transformation to alter the location and the size of those objects so that they will be appropriately when positioned over a different background image. While this was described in the context of a football play, the same process can be used in any context where this capability is desired. FIG. 32 shows file 1000, originally shown in FIG. 10, and a different background image 3200. It may be that FIG. 10 included cars drawn on a generic intersection drawing, such as might be produced as part of a police report. The actual dimensions of Vine and Elm are shown accurately in the background image 3200, with the drawing of car "1" on 3200 being approximately to scale. Consequently, to move the objects (cars) and motion paths from how they are shown in file 1000 to the new background image 3200 will require different transformations for different segments, as shown by the arrows found on FIG. 32. The extraction, transformation analysis, and redrawing of the information found in the original drawing 1000 onto the desired background 3200 can be performed using the same processes and methods described above.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for generated computer graphics files comprising:
   a) identifying an input file containing graphic elements and an original a) background image;
   b) identifying original segments of the original background image;
   c) identifying target segments in a new background image, wherein each original segment corresponds to a respective target segment;
   d) defining segment transformations to transform original locations within the original segments and to new locations in the respective target segments;
   e) identifying, using rules, objects that are represented as the graphic elements in the input file;
   f) identifying original object locations of the objects in the input file, wherein each original object location is within at least one original segment;
   g) preparing attached objects by:
      i) identifying a base object,
      ii) identifying the attached objects where the original object location of the attached objects are proximal to the original object location of the base object, and
      iii) determining a slot position for the attached objects, wherein the slot position is a value indicative of the original object location of the attached objects relative to the original object location of the base object;
   h) applying the segment transformations to the original object locations to identify new object locations, wherein the new object locations for the attached objects are determined by:
      i) applying the segment transformation to the original object location of the base object to identify a new object location for the base object, and
      ii) determining the new object locations for the attached objects utilizing the new object location for the base object and the slot position; and
   i) generating a new graphics file combining the new background image and renderings of the objects at the new object locations.

2. The method of claim 1, wherein the original object locations have an original x-axis location, and wherein the original object location of a particular attached objects is proximal to the original object location of the base object when the original x-axis location of the particular attached object is proximal to:
   i) the original x-axis location of the base object, or
   ii) the original x-axis location of another one of the attached objects.

3. The method of claim 1, wherein a first set of original segments are defined by positions along a first axis that defines picture elements within the input file, wherein a first set of segment transformation reflect differences in length along the first axis between the first set of original segments and the respective target segments.

4. The method of claim 3, wherein a second set of original segments are defined by positions along a second axis that defines picture elements within the input file, wherein a second set of segment transformation reflect differences in length along the second axis between the second set of original segments and the respective target segments.

5. The method of claim 4, wherein a plurality of original segments comprise the first set of original segments, and a single original segment comprises the second set of original segments.

6. The method of claim 5, wherein the first axis is an x-axis of the input file, the second axis is a y-axis of the input file, wherein the new object location for a particular object is determined by applying a single one of the plurality of original segments to determine a new x-axis location of the particular object and applying the single original segment to determine a new y-axis location of the particular object.

7. The method of claim 6, wherein the step of applying the single one of the plurality of original segments comprises selecting the single one of the plurality of original segments by identifying the original segment relating to an original x-axis location of the original object location for the particular object.

8. The method of claim 7, wherein the segment transformations are linear transformations.

9. The method of claim 8, wherein a particular attached object is proximal to the original base object location when the original x-axis location of the particular attached object is proximal to:
   i) the original x-axis location of the base object, or
   ii) the original x-axis location of another one of the attached objects.

10. The method of claim 9, wherein x-axis locations are proximal when they are within a distance that is less than 1.5 times of a width of the base object.

11. The method of claim 8, wherein a particular attached object is proximal to the original base object location when the original object location for the particular attached object is within the original segment that contains the base object.

12. The method of claim 8, wherein the attached objects have a new y-axis location in the new graphics file, wherein the new y-axis location of a first attached objects differs from the new y-axis location of the base object by more than a height of the base object in the new graphics file.

13. The method of claim 8, wherein the new object locations for the attached objects are determined utilizing the new base object location and a multiplier times the slot position, wherein the multiplier reflects a relative size change of the renderings of the objects in the new graphics file.

14. The method of claim 1, wherein a first identified object has two original object locations, namely an original PreEvent location and an original AtEvent location, further wherein the segment transformations are assigned to both the original PreEvent location and the original AtEvent location, further wherein the new graphics file comprises the first identified object at a new PreEvent location and a new AtEvent location.

15. The method of claim 1, further identifying, using the rules, a first movement represented as a first graphic element in the input file, the first movement being associated with a first object, further comprising applying at least one segment transformation to the first movement to identify a new first movement location, wherein the new graphics file includes rendering of the first movement utilizing the new first movement location.

16. The method of claim 15, wherein the first movement is represented by a plurality of graphic elements in the input file include the first graphic element, wherein the plurality of graphic elements define a plurality of motion sections.

17. The method of claim 16, wherein a depth value for the first movement is included in the new graphics file proximate to the rendering of the first object, wherein the depth value is determined in part by:
  i) generating a list, the list being an ordered list of points, wherein each point identifies X, Y termination position for one motion section,
  ii) traversing the list in order to select only points as selected points that have a following point on the list, where the following point on the list has a differing X position than the selected point, and
  iii) identifying a Y position for the selected point that is last selected.

18. The method of claim 16, wherein a first motion section traverses a plurality of original segments, further comprising scaling the motion section along an X-axis utilizing the segment transformations.

\* \* \* \* \*